(12) United States Patent
Hogan et al.

(10) Patent No.: US 6,573,412 B1
(45) Date of Patent: Jun. 3, 2003

(54) CHAIN-COUPLED POLYMERIC ALKOXIDE COMPOUNDS HAVING CONTROLLED VISCOSITY

(75) Inventors: Terrence E. Hogan, Cuyahoga Falls, OH (US); William L. Hergenrother, Akron, OH (US); James E. Hall, Mogadore, OH (US)

(73) Assignee: Bridgestone Corporation, Tokyo (JP)

( * ) Notice: Subject to any disclaimer, the term of this patent is extended or adjusted under 35 U.S.C. 154(b) by 0 days.

(21) Appl. No.: 09/570,578

(22) Filed: May 12, 2000

(51) Int. Cl.[7] .............................................. C07C 43/11
(52) U.S. Cl. ...................... 568/616; 568/606; 556/482; 528/392; 528/396
(58) Field of Search ........................... 525/539; 568/606

(56) References Cited

U.S. PATENT DOCUMENTS

| | | | | |
|---|---|---|---|---|
| 2,476,307 A | * | 7/1949 | Klein et al. ............... 260/448.8 |
| 3,655,598 A | * | 4/1972 | Antonen ..................... 260/18 S |
| 3,676,529 A | * | 7/1972 | Fall ............................. 260/887 |
| 3,915,924 A | | 10/1975 | Wright .................... 260/37 SB |
| 4,004,070 A | | 1/1977 | Farrar ............................. 526/86 |
| 4,083,834 A | | 4/1978 | Komatsu et al. ............. 260/79.5 |
| 4,261,758 A | | 4/1981 | Wright et al. .......... 106/287.12 |
| 4,273,698 A | | 6/1981 | Smith, Jr. et al. ........ 260/37 SB |
| 4,411,704 A | | 10/1983 | Galeski et al. .......... 106/308 Q |
| 4,419,482 A | | 12/1983 | Teyssie et al. ............... 524/560 |
| 4,550,142 A | | 10/1985 | Akita et al. .................. 525/236 |
| 4,708,990 A | | 11/1987 | Wong et al. .................. 525/250 |
| 4,835,220 A | | 5/1989 | Bronstert et al. ............ 525/250 |
| 4,835,221 A | | 5/1989 | Bronstert et al. ......... 525/332.8 |
| 5,059,648 A | | 10/1991 | Fukushima et al. ......... 524/380 |
| 5,071,891 A | | 12/1991 | Harrison et al. ............. 523/209 |
| 5,248,736 A | | 9/1993 | Suzuki et al. ................ 525/346 |
| 5,473,020 A | | 12/1995 | Peifer et al. ................. 525/243 |
| 5,508,333 A | | 4/1996 | Shimizu ....................... 524/424 |
| 5,508,336 A | * | 4/1996 | Takeichi et al. ............. 524/496 |
| 5,659,056 A | | 8/1997 | Hergenrother et al. ...... 556/401 |
| 5,708,092 A | * | 1/1998 | Schwindeman et al. .... 525/272 |
| 5,710,224 A | | 1/1998 | Alt et al. ...................... 526/160 |
| 5,719,249 A | | 2/1998 | Fujita et al. ................... 528/27 |
| 5,750,589 A | * | 5/1998 | Zech et al. .................. 523/109 |
| 5,866,171 A | | 2/1999 | Kata ............................. 425/46 |
| 5,876,527 A | | 3/1999 | Tsuruta et al. ............... 152/541 |
| 5,931,211 A | | 8/1999 | Tamura ..................... 152/209.5 |
| 5,971,046 A | | 10/1999 | Koch et al. ............... 152/152.1 |
| 6,008,295 A | | 12/1999 | Takeichi et al. ............. 252/105 |
| 6,133,376 A | | 10/2000 | Hsich et al. ................. 525/101 |
| 6,207,766 B1 | * | 3/2001 | Doi et al. .................... 525/403 |
| 6,271,317 B1 | | 8/2001 | Halasa et al. ............. 525/333.1 |

FOREIGN PATENT DOCUMENTS

| | | | |
|---|---|---|---|
| EP | 0 219 809 A1 | * 10/1986 | ........... C08C/19/44 |
| EP | 0 801 112 | 10/1997 | |
| EP | 0 890 603 | 1/1999 | |
| EP | 0 890 606 | 1/1999 | |
| EP | 1 031 604 | 8/2000 | |
| EP | 1 061 097 | 12/2000 | |
| JP | 57-205433 | * 12/1982 | ........... C08L/21/00 |
| JP | 08012721 | 1/1996 | |
| JP | 11 181161 | 7/1999 | |
| WO | WO 93/04094 | 3/1993 | |
| WO | WO 01/87993 A2 | * 11/2001 | ............. C08F/8/00 |

* cited by examiner

*Primary Examiner*—David W. Wu
*Assistant Examiner*—Rip A Lee
(74) *Attorney, Agent, or Firm*—Meredith E. Palmer; Barbara Arndt (57) ABSTRACT

The invention provides chain-coupled polymeric alkoxide compounds for use as the elastomeric component in vulcanizable elastomeric compositions comprising silica, carbon black or mixtures thereof. In particular, the invention provides anionically polymerized polymers having polymer chain living ends that are functionalized with alkoxide groups and coupled together by a metal or nonmetal atom. The polymeric alkoxide compounds have an initial high viscosity for ease of handling prior to compounding, a stable viscosity during storage, and a decreased compound viscosity for better filler dispersion and improved mixing efficiency. The invention further provides a pneumatic tire having at least one component produced from the vulcanizable elastomeric composition of the invention.

22 Claims, 1 Drawing Sheet

Figure 1

CHAIN-COUPLED POLYMERIC ALKOXIDE COMPOUNDS HAVING CONTROLLED VISCOSITY

FIELD OF THE INVENTION

The invention generally relates to polymers employed in silica-filled vulcanizable elastomeric compositions. More particularly, the invention relates to stabilization of the viscosity of the polymers when exposed to moisture during desolventization and ambient storage conditions.

BACKGROUND OF THE INVENTION

When producing polymers for use in rubber articles, such as tires, power belts, and the like, it is desirable that these polymers are easily processable during compounding and have a high molecular weight with a controlled molecular weight distribution, glass transition temperature ($T_g$) and vinyl content. It is also desirable that reinforcing fillers, such as silica and/or carbon black, be well dispersed throughout the rubber in order to improve various physical properties. Good dispersion of carbon black may be achieved, for example, by end-capping polydienes by reacting a living end of the polymer with an end-capping agent, or by utilizing functionalized anionic polymerization initiators such as lithium-based amine or amide initiators that incorporate a functional group onto one or both ends of the polymer chain. Rubber articles produced from vulcanized elastomers exhibiting these characteristics, will have reduced hysteresis resulting in an increase in rebound, a decrease in rolling resistance and less heat build-up when mechanical stresses are applied. These properties, in turn, result in lowered fuel consumption for vehicles using such tires.

With the increasing use of silica as a reinforcing filler for rubber, filler dispersion in rubber stocks has become a major concern. Because polar silanol groups on the surface of silica particles tend to self-associate, reagglomeration of silica particles occurs after compounding, leading to poor silica dispersion, a high compound viscosity and a shorter scorch time. One approach to achieving better dispersion of silica during compounding, disclosed in our co-pending, co-owned U.S. patent application, Ser. No. 08/891,569, involves termination of elastomeric polymers, such as diene rubbers, with a tin-containing coupling agent, such as tin tetrachloride, an organo-tin halide, a dialkyldioxastannylane compound, and the like, resulting in an increase in the Mooney viscosity of the gum polymer, which is desirable for better initial processability of the polymer. During compounding of the tin-functionalized polymers, the polymer carbon-tin bonds are cleaved, resulting in lower molecular weight fragments and, concomitantly, a lowered viscosity which allows better dispersability of the silica filler during compounding.

Another approach to improving dispersion of silica filler, involves modification of polymer chains with functional end groups that interact with or shield the surface hydroxyl groups on the silica filler. In particular, siloxane-terminated polymers are well known and their preparation is disclosed in U.S. Pat. Nos. 3,244,664 and 4,185,042. Siloxane-terminated polymers have a carbon-silicon bond and at least one terminal O—R group that reacts with the silica surface, forming an Si—O—Si linkage.

Although siloxane-terminated polymers have provided adequate dispersion of reinforcing fillers during compounding, there has been a problem with stabilizing the Mooney viscosity of the gum polymer prior to compounding. In particular, polymers produced by solution polymerization in inert organic solvents, such as hexane, require a desolventization step after polymerization. Although desolventization may be achieved by drum-drying, in commercial practice desolventization is achieved through the use of either steam or heated water. When the polymer chains are terminated by siloxane compounds, hydrolysis of pendant —Si—OR end groups during the desolventization step, leads to coupling of the polymer chains via formation of —Si—O—Si— bonds between two or more siloxane end groups, resulting in a large increase in the polymer molecular weight and, concomitantly, a large increase in the Mooney viscosity of the gum polymer. Moreover, during storage of siloxane-terminated polymers for a period of time prior to compounding, humid environmental conditions and residual water from desolventization can lead to further hydrolysis of end groups and polymer chain coupling, and a further increase in viscosity.

Several approaches have been taken to overcome this hydrolysis and coupling problem. For example, U.S. Pat. No. 5,659,056 discloses the use of acids such as $C_1$ to $C_{12}$ aliphatic and $C_6$ to $C_{12}$ cycloaliphatic and aromatic carboxylic acids including acetic acid, propionic acid, butyric acid, decanoic acid, cyclohexanoic acid, benzoic acid, and the like, as well as acyl halides thereof, as viscosity stabilizing agents to treat the polymer prior to desolventization. These viscosity stabilizing agents do not react with the siloxane terminal end groups of the polymer, but rather serve to neutralize the by-product lithium compounds in admixture with the polymer, thereby slowing the rate of formation of low boiling alcohols during desolventization, slowing the rate of the hydrolysis reaction and, therefore, slowing the rate of coupling of the polymer. In this manner, the increase in Mooney viscosity of the gum polymer during the steam or heated water desolventization step is substantially reduced.

Other approaches to controlling the Mooney viscosity of such siloxane-terminated polymers have included the use of alkyl alkoxysilanes, such as n-octyl triethoxysilane, as viscosity stabilizing agents. As disclosed in our co-owned, copending U.S. patent application Ser. No. 09/360,551, these viscosity stabilizing agents are also added prior to desolventization but, unlike the acids described above, they react with the siloxane-terminated polymers. Moreover, viscosity stabilizing agents such as alkyl alkoxysilanes eliminate, rather than just slow down, any increase in the Mooney viscosity for a period of time. The successful use of these viscosity stabilizing agents, however, is concentration dependent. That is, the number of —SiOR groups available from the addition of the viscosity stabilizing agent must be such that the majority of the Si—O—Si bonds formed are between the hydrolyzable siloxane-terminated polymer and the viscosity stabilizing agent, not between the polymers themselves. Moreover, alkyl alkoxysilanes are relatively expensive compared to many other materials.

In another approach, our co-owned, copending U.S. patent application Ser. No. 09/449,303 discloses a method for stabilizing the Mooney viscosity of siloxane-terminated polymers, having at least one hydrolyzable constituent, by exchanging the alcohol of the siloxane terminal group for a long chain alcohol, such as an aliphatic, cycloaliphatic, or aromatic alcohol having at least 6 carbon atoms, or with a fatty acid ester of a hydrogenated or non-hydrogenated $C_5$ or $C_6$ sugar. The presence of the long chain alcohol or fatty acid ester sterically inhibits the availability of the hydrolyzable bond(s) to moisture. This approach results in slowing of the rate of coupling of the polymer which, in turn, slows the foreseen increase in Mooney viscosity of the siloxane-terminated polymer.

Although the above approaches to control of the Mooney viscosity of polymers having a hydrolyzable substituent have been shown to be successful, the need continues for alternative methods for controlling the rate of increase of Mooney viscosity of polymers prior to compounding, and also to provide a desirable lower viscosity during and after compounding for processability and adequate dispersion of the reinforcing fillers, especially silica.

SUMMARY OF THE INVENTION

The invention provides chain-coupled polymeric alkoxide compounds for use as high molecular weight polymers in vulcanizable elastomeric compositions comprising silica, carbon black, or mixtures of silica and carbon black as reinforcing fillers. The polymeric compounds of the invention are especially useful because of their processability when used in rubber making, i.e., they have an initial high molecular weight (high viscosity) at synthesis for ease of handling prior to compounding, and they are extremely resistant to any increase in viscosity due to the presence of moisture during desolventization or storage prior to compounding. During compounding, the viscosity of the polymers decreases as polymer chains become decoupled, to provide a reduced viscosity and improved interaction with the reinforcing filler for better filler dispersion. Moreover, the viscosity of the resulting compound provides for good processability during extrusion or molding of the compound at the tire plant.

In particular, the polymeric alkoxide compounds of the invention have the formula $$(PAO)_n M^{+z} P'_{z-n}$$

where P is a polymer chain; AO is an alkoxide group; P' is another polymer chain P or is an "R" group selected from the group consisting of alkyl groups having one to about 30 carbon atoms, aromatic groups having about 6 to about 20 carbon atoms, and cycloalkyl groups having about 5 to about 20 carbon atoms; M is a metal atom or a nonmetal atom, having an oxidation state "z" of greater than one, wherein the nonmetal atom is selected from the group consisting of atoms of phosphorus, boron, nitrogen and sulfur; and n is an integer having a value of from 1 to z. Preferably the metal atom is selected from the group consisting of atoms of silicon, tin, titanium aluminum, arsenic, copper, calcium and zinc. For purposes of simplicity, silicon is considered herein to be a metal; however, one skilled in the art will understand that a silicon atom may act as either a metal or a nonmetal atom in the invention compounds.

The polymeric alkoxide compounds are produced by the process of reacting the living end of a polymer chain prepared by anionic polymerization with a monoalkyl metal initiator, after solution polymerization but while still in the presence of an inert solvent, with an alkoxide precursor compound selected from the group consisting of alkylene oxides and carbonyl compounds, and, subsequently, reacting the polymer chain with a coupling agent having the formula $$M^{+z} X_{z-m} R_m$$

where $M^{+z}$ and R are the same as above, X is a halide, (z−m) represents an integer having a value of at least 2, and m is an integer having a value of zero to (z−2).

In one embodiment of the invention, the polymer chain having the living end is selected from the group consisting of homopolymers, copolymers and terpolymers of alkylene oxide monomers. For example, the monomers include, but are not limited to, ethylene oxide, propylene oxide, styrene oxide, cyclohexene oxide, cyclopentene oxide, and the like. In this embodiment of the invention, the step of reacting the living end of the polymer chain with an alkoxide precursor compound, prior to the reacting the polymer chain with the coupling agent, is omitted.

In another embodiment of the invention, the polymer chain having the living end is selected from the group consisting of homopolymers of conjugated diene monomers, and copolymers and terpolymers of the conjugated diene monomers with monovinyl aromatic monomers and trienes. Preferably, the polymer chain is selected from the group consisting of polyisoprene, polystyrene, polybutadiene, butadiene-isoprene copolymer, butadiene-isoprene-styrene terpolymer, isoprene-styrene copolymer, and styrene-butadiene copolymer. In another embodiment of the invention, one or more of these polymers are employed as the elastomeric component in a sulfur-vulcanizable elastomeric composition including a reinforcing filler selected from the group consisting of silica, carbon black, and mixtures thereof, and a cure agent. The invention further provides a pneumatic tire having at least one component produced from the vulcanizable elastomeric composition.

The polymeric alkoxide compound of the invention has an initial viscosity and, preferably, the viscosity of the compound does not increase above the initial viscosity by more than about 50%, more preferably not more than about 25%, and especially not more than about 10%, over a time period in storage of up to about two years, in ambient environmental conditions which may include hot, humid conditions.

The invention further provides a method for improving the mixing efficiency during compounding of an elastomer with a reinforcing filler, comprising the steps of providing a polymeric alkoxide compound having the formula described above; mixing the polymer in a mixer with a reinforcing filler selected from the group consisting of silica, carbon black, and mixtures thereof; providing a source of moisture; heating the mixture to a temperature of about 60° C. to about 200° C.; wherein during the mixing step up to "n" O—M groups are hydrolyzed in the presence of the moisture and heat resulting in uncoupling of up to "n" polymer chains and a decrease in the viscosity of the mixture. Preferably, P' is also a P polymer chain and, during the mixing step, up to "z-n" polymer chain carbon-M group bonds may be cleaved, resulting in a further decrease in the viscosity of the mixture. For example, cleavage of polymer carbon-M group bonds is known under these conditions when the M group is tin, lead, mercury or cadmium.

Due to hydrolysis of the O—M groups, accompanied or unaccompanied by cleavage of polymer chain carbon-M groups, a vulcanizable elastomeric compound comprising the invention polymeric alkoxide compound has a viscosity that is reduced compared with the viscosity of an equivalent vulcanizable elastomeric compound comprising the same polymer, i.e., having the same monomer units, an equivalent molecular weight and initial degree of coupling, that does not contain either a hydrolyzable O—M group or a cleavable carbon-M group.

DETAILED DESCRIPTION OF THE INVENTION

The invention relates to polymeric alkoxide compounds having the formula:

$$(PAO)_n M^{+z} P'_{z-n}$$

where P is a polymer chain; AO is an alkoxide group; P' is another polymer chain P or is an "R" group selected from the group consisting of alkyl groups having one to about 30 carbon atoms, aromatic groups having about 6 to about 20 carbon atoms, and cycloalkyl groups having about 5 to about 20 carbon atoms; M is a metal atom or a nonmetal atom, having an oxidation state "z" of greater than one, wherein the nonmetal atom is selected from the group consisting of atoms of phosphorus, boron, nitrogen and sulfur; and n is an integer having a value of from 1 to z. Preferably, the metal atom is selected from the group consisting of atoms of silicon, tin, titanium, aluminum, arsenic, copper, calcium and zinc. Less preferably, however, the metal atom may also be selected from the group consisting of lead, mercury and cadmium, as discussed further below. The oxidation state of the metal or nonmetal atom (z) may range from 2 to 6, but preferably ranges from 4 to 6.

The polymer chain P of the polymeric alkoxide compound is preferably produced by solution anionic polymerization of monomers in the presence of a monoalkyl metal polymerization initiator in an inert, anhydrous, aprotic solvent. Each polymer chain so produced has a single living end terminated with the metal atom from the initiator. When polymerization is complete, but while the polymer is still in the presence of the inert solvent, the living end of the polymer is first reacted with an alkoxide precursor compound, selected from the group consisting of alkylene oxides and carbonyl compounds having the formulas described below. While still in the inert solvent, the alkoxide-terminated polymer chains are subsequently coupled together by a reaction with a coupling agent containing a metal or nonmetal atom having the formula $$M^{+z} X_{z-m} R_m$$

where $M^{+z}$ and R are the same as above, X is a halide; (z−m) represents an integer having a value of at least 2, and m is zero or an integer having a value of 1 to (z−2).

Any anionically polymerizable monomers may be employed to form homopolymer, copolymer or terpolymer chains (P) of the invention polymeric alkoxide compounds. For example, in one embodiment of the invention, alkylene oxide monomers such as ethylene oxide, propylene oxide, styrene oxide, cyclohexene oxide, cyclopentene oxide, and the like, may be anionically polymerized to form polyethylene oxide, polypropylene oxide, polystyrene oxide, polycyclohexene oxide or polycyclopentene homopolymers, or copolymers or terpolymers comprising the monomers. As described further below, because these polymers already contain an alkylene oxide group at the living end, the step in the process wherein the living end of the polymer chain is reacted with an alkoxide precursor compound, prior to the reacting the polymer chain with the coupling agent, is omitted. That is, in this embodiment of the invention, the living end of the polymer chain is directly reacted with the coupling agent.

In another embodiment of the invention, conjugated diene monomers, monovinyl aromatic monomers, triene monomers, and the like, may be anionically polymerized to form homopolymers of conjugated diene monomers, and copolymers or terpolymers of the conjugated diene monomers with monovinyl aromatic monomers and trienes. Thus, the elastomeric products may include diene homopolymers from monomer A and copolymers thereof with monovinyl aromatic monomers B. Exemplary diene homopolymers are those prepared from diolefin monomers having from 4 to about 12 carbon atoms. Exemplary vinyl aromatic copolymers are those prepared from monomers having from 8 to about 20 carbon atoms. Copolymers can comprise from about 99 to 10 percent by weight of diene units and from about 1 to about 90 percent by weight of monovinyl aromatic or triene units, totaling 100 percent. The polymers, copolymers and terpolymers of the present invention may have 1,2-microstructure contents ranging from about 10 to about 80 percent, with the preferred polymers, copolymers or terpolymers having 1,2-microstructure contents of from about 25 to 65 percent, based upon the diene content. The elastomeric copolymers are preferably random copolymers which result from simultaneous copolymerization of the monomers A and B with randomizing agents, as is known in the art. Block copolymers, poly (b-B-b-A-b-B), result from the sequential polymerization of the monomers forming the A and B blocks, as is known in the art. Often, such block copolymers which include poly(b-styrene-b-butadiene-b-styrene), are thermoplastic elastomers, sometimes referred to as S-B-S polymers.

Preferred polymers as the polymeric component of the invention polymeric alkoxide compound for use in a vulcanizable elastomeric composition include polyisoprene, polystyrene, polybutadiene, butadiene-isoprene copolymer, butadiene-isoprene-styrene terpolymer, isoprene-styrene copolymer, and styrene-butadiene copolymer.

Monoalkyl metal anionic polymerization initiators for use in polymerizing the anionically polymerizable monomers include, but are not limited to, organo-sodium, organo-potassium, and organo-lithium initiators. As an example of such initiators, organo-lithium compounds useful in the polymerization of 1,3-diene monomers are hydrocarbyl lithium compounds having the formula RLi, where R represents a hydrocarbyl group containing from one to about 20 carbon atoms, and preferably from about 2 to about 8 carbon atoms. Although the hydrocarbyl group is preferably an aliphatic group, the hydrocarbyl group can also be cycloaliphatic or aromatic. The aliphatic group may be a primary, secondary, or tertiary group, although the primary and secondary groups are preferred. Examples of aliphatic hydrocarbyl groups include methyl, ethyl, n-propyl, isopropyl, n-butyl, sec-butyl, t-butyl, m-amyl, sec-amyl, n-hexyl, sec-hexyl, n-heptyl, n-octyl, n-nonyl, n-dodecyl, and octadecyl. The aliphatic group can contain some unsaturation, such as allyl, 2-butenyl, and the like. Cycloalkyl groups are exemplified by cyclohexyl, methylcyclohexyl, ethylcyclohexyl, cycloheptyl, cyclopentylmethyl, and methylcyclopentylethyl. Examples of aromatic hydrocarbyl groups include phenyl, tolyl, phenylethyl, benzyl, naphthyl, phenyl cyclohexyl, and the like.

Specific examples of organo-lithium compounds which are useful as anionic initiators in the polymerization of the monomers listed above, especially conjugated dienes, in accordance with the process of the present invention include, but are not limited to, n-butyl lithium, n-propyl lithium, isobutyl lithium, tertiary butyl lithium, amyl-lithium, cyclohexyl lithium, and the like, and especially tributyl tin lithium as disclosed in our co-owned U.S. Pat. No. 5,268,439. Other suitable organo-lithium compounds for use as anionic initiators are well known to those skilled in the art. Mixtures of different lithium initiator compounds also can be employed. The preferred organo-lithium initiator is n-butyl lithium, and "in situ" produced lithium hexamethyleneimide initiator prepared by reacting hexamethyleneimine and n-butyl lithium, as disclosed in our co-owned U.S. Pat. No. 5,496,940.

The amount of initiator required to effect the desired polymerization can be varied over a wide range depending upon a number of factors, such as the desired polymer molecular weight, the desired 1,2- and 1,4-content of the polydiene, and the desired physical properties for the polymer produced. In general, the amount of initiator utilized can vary from as little as 0.2 millimoles of lithium per 100 grams of monomers up to about 100 millimoles of lithium per 100 grams of monomers, depending upon the desired polymer molecular weight. In particular, for rubber applications, the desired number average molecular weight of the polymer prior to coupling is about 80,000 to 150,000, and after coupling is about 100,000 to about 500,000.

Polymerization is usually conducted in a conventional inert, anhydrous, aprotic solvent for anionic polymerizations, such as hexane, cyclohexane, benzene, and the like. Various techniques for polymerization, such as semi-batch and continuous polymerization may be employed. In order to promote randomization in copolymerization and to increase vinyl content, a polar coordinator may optionally be added to the polymerization ingredients. Amounts range between about 0.1 to about 90 or more equivalents per equivalent of initiator metal (e.g., lithium, sodium or potassium). The amount depends upon the type of polar coordinator that is employed, the amount of vinyl desired, the level of styrene, if employed, and the temperature of the polymerizations, as well as the selected initiator.

Compounds useful as polar coordinators are organic and include tetrahydrofuran, linear and cyclic oligomeric oxolanyl alkanes such as 2-2'-di(tetrahydrofuryl) propane, di-piperidyl ethane, hexamethylphosphoramide, N-N'-dimethylpiperazine, diazabicyclooctane, dimethyl ether, diethyl ether, tributylamine, and the like. The linear and cyclic oligomeric oxolanyl alkane polar coordinators are described in U.S. Pat. No. 4,429,091, the subject matter of which related to polar coordinators is incorporated herein by reference. Other compounds useful as polar coordinators include those having an oxygen or nitrogen hetero-atom and a non-bonded pair of electrons. Examples include dialkyl ethers of mono and oligo alkylene glycols; "crown" ethers; and tertiary amines, such as tetramethylethylene diamine (TMEDA).

Polymerization is begun by charging a blend of the monomer(s) and solvent to a suitable reaction vessel, followed by the addition of the polar coordinator and the initiator previously described. The procedure is carried out under anhydrous, anaerobic conditions. Often, it is conducted under a dry, inert gas atmosphere. The polymerization can be carried out at any convenient temperature, such as about 0° C. to about 150° C. For batch polymerizations, it is preferred to maintain the peak temperature at from about 45° C. to about 150° C., and more preferably from about 60° C. to about 100° C. Polymerization is allowed to continue under agitation for about 0.15 to 24 hours. After polymerization is complete, the living end of the polymer chain is reacted with an alkoxide precursor compound (that is, if the polymer chain is not already terminated with an alkylene oxide group derived from polymerization of alkylene oxide monomers), followed by coupling of the polymer chains by the metal halide coupling agent, as described in greater detail herein below. The molar ratio of polymer to alkoxide precursor determines the number of polymer chains that are reacted with the alkoxide precursor compound. For example, an organo-lithium initiator, such as n-butyl lithium, may be used to polymerize a polymer (P) having an Li$^+$ living end that is reacted with an alkoxide precursor (A) to produce P—AO$^-$Li$^+$ polymer chains. The addition of 0.75 moles of the alkoxide precursor compound to 1.0 moles of polymer results in a mixture containing 0.75 moles P—AO$^-$Li$^+$ chains and 0.25 moles P$^-$Li$^+$ chains. Similarly, the addition of 0.5 moles of the alkoxide precursor compound to 1.0 moles of polymer results in a mixture containing 0.5 moles of P—AO$^-$Li$^+$ chains and 0.5 moles of P$^-$Li$^+$ chains; a molar ratio of 1.0 moles alkoxide precursor to 1.0 mole of polymer results in virtually all P—AO$^-$Li$^+$ chains; and a molar ratio of 0.25 moles alkoxide precursor to 1.0 moles of polymer results in a mixture containing 0.25 moles P—AO$^-$Li$^+$ chains and 0.75 moles P$^-$Li$^+$ chains.

The metal halide coupling agent reacts with the alkoxide-modified living end of the polymer chains to produce coupled polymer chains such as those having the formulas: $(P—AO)_z—M^z$; $(PAO)_{z-1}—M^z—P'$; $(PAO)_{z-2}—M^z—P'_2$ and the like, when m is zero. Moreover, when m is not zero, up to $(z-2)$ R groups may be coupled to the metal or nonmetal atom, in addition to two or more polymer P' or PAO chains.

The alkylene oxide precursor terminating agent is added to the reaction vessel and the vessel is agitated for about 0.1 to about 4.0 hours. The coupling agent is then added to the vessel, and agitation continues for a further about 0.1 to about 4 hours. For purposes of comparison with the invention polymeric alkoxide compounds in examples described below, other comparative polymers may be terminated by a different quenching agent, an endcapping agent, or a coupling agent, as is known to those skilled in the art. Whatever terminating agent is employed, it is added to the reaction vessel after polymerization is complete, and the vessel is agitated for about 0.1 to about 4.0 hours. Quenching is usually conducted by stirring the polymer and quenching agent for about 0.01 hours to about 1.0 hour at temperatures of from about 20° C. to about 120° C. to ensure a complete reaction. The polymers of the invention are subsequently quenched with an alcohol or other quenching agent.

Lastly, the solvent is removed from the polymer by conventional techniques such as drum drying, extruder drying, vacuum drying or the like, which may be combined with coagulation with heated water, alcohol or steam. If coagulation with heated water or steam is used, oven drying may be desirable. As discussed above, in commercial operations, desolventization is most frequently achieved by the use of heated water or steam.

Various techniques known in the art for carrying out polymerizations may be used to form the polymeric alkoxide compounds of the invention without departing from the scope of the present invention.

According to the process described above, in one embodiment of the invention, the alkoxide precursor reacted with the living end of the polymer chain is an alkylene oxide having the formula where $R_1$, $R_2$, $R_3$ and $R_4$ are the same or different from each other, and are independently selected from the group consisting of hydrogen atoms, alkyls having one to about 30 carbon atoms, aromatics having about 6 to about 20 carbon atoms, and cycloalkyls having about 5 to about 20 carbon atoms. Preferably, the alkylene oxide is selected from the group consisting of ethylene oxide, propylene oxide, cyclohexene oxide, cyclopentene oxide and styrene oxide.

In another embodiment of the invention, the alkoxide precursor is a carbonyl compound having the formula wherein D and E are the same or different from each other, and wherein D and E may be bonded to each other to form a cyclic compound, and wherein D and E are independently selected from the group consisting of alkyls having one to about 30 carbon atoms, aromatics having about 6 to about 20 carbon atoms, dialkyl amino-substituted aromatics wherein each alkyl group has about one to about 30 carbon atoms, cycloalkyls having about 5 to about 20 carbon atoms, and dialkyl amino compounds wherein each alkyl group has about one to about 30 carbon atoms. Preferably, the carbonyl compound is selected from the group consisting of tetramethyldiamino-benzophenone, 1,3-dimethyl-2-imidazolidinone, 1-alkyl substituted pyrrolidinones, 1-aryl substituted pyrrolidinones, and mixtures thereof.

The metal halide coupling agent having the formula $M^{+z}X_{z-m}R_m$ is preferably selected from the group consisting of silicon tetrachloride, alkyltrichlorosilane, dialkyldichlorosilane, silicon tetrabromide, alkyltribromosilane, dialkyldibromosilane, tin tetrachloride, alkyl tin trichloride, dialkyl tin dichloride, tin tetrabromide, alkyl tin tribromide, dialkyl tin dibromide, titanium tetrachloride, alkyl titanium trichloride, dialkyl titanium dichloride, titanium tetrabromide, alkyl titanium tribromide, dialkyl titanium dibromide, aluminum trichloride, alkyl aluminum dichloride, aluminum tribromide, alkyl aluminum dibromide, arsenic trichloride, alkyl arsenic dichloride, arsenic tribromide, alkyl arsenic dibromide, boron trichloride, alkyl boron dichloride, boron tribromide, alkyl boron dibromide, nitrogen trichloride, alkyl nitrogen dichloride, nitrogen tribromide, alkyl nitrogen dibromide, phosphorus trichloride, alkyl phosphorus dichloride, phosphorus tribromide, alkyl phosphorus dibromide, copper dichloride, copper dibromide, calcium dichloride, calcium dibromide, zinc dichloride, zinc dibromide, sulfur dichloride, and mixtures thereof.

It is preferred that the polymers according to the present invention have at least about 20 percent chain coupling. That is, about 20 percent of the polymer mass after coupling is of higher molecular weight than the polymer before coupling as measured, for example, by gel permeation chromatography. Preferably, before coupling, the polydispersity (the ratio of the weight average molecular weight to the number average molecular weight) of the polymers can be controlled over a wide range, from 1 to about 20, preferably 1 to about 5, and more preferably 1 to about 2. It is recognized that the polymers according to the present invention may contain from about 10 to about 80 percent by weight of coupled polymer containing polymer carbon-M bonds, and correspondingly from about 90 to about 20 percent by weight of polymer containing polymerAO—M bonds, where the AO groups are derived from the reaction of the metal halide coupling agent with the alkoxide-modified chain ends. However, the preferred compositions contain at least two polymer AO—M bonds, and preferably contain three or more AO—M bonds, i.e., the preferred polymers of the invention have the formula $(PAO)_{z-1}M^z$—P' and $(PAO)_zM^z$.

As is known in the art, the polymeric alkoxide compounds of the present invention may contain a functional group derived from anionic polymerization initiator at the head (initiator) end of the polymer chain, in addition to the functional group derived from the coupling agent at the terminal end of the chain. These functional groups may have an affinity for compounding filler materials such as silica or carbon black.

To provide a better understanding of the process of preparation of the polymeric alkoxide compounds of the invention, the following example, which is not intended to limit the scope of the invention, is provided.

Styrene-butadiene (SBR) copolymer chains, produced by solution anionic polymerization employing n-butyl lithium as the initiator are reacted with ethylene oxide (the alkoxide precursor) in a ratio of 1.0 mole ethylene oxide to 1.0 mole SBR; and the resulting alkoxide-modified polymer chains are coupled together employing silicon tetrachloride (SiCl$_4$) as the coupling agent, in the following reactions:

Varying the molar ratios of the alkylene oxide precursor (AO) to the polymer chains (P), and coupling with silicon tetrachloride, results in coupled polymeric alkoxide products, such as the (P—AO)$_4$—Si; (P—AO)$_3$—Si—P'; (P—AO)$_2$—Si—(P')$_2$; and the like.

It will be appreciated that, in contrast to siloxane-terminated polymers having a hydrolyzable substituent group, the chain-coupled polymeric alkoxide compounds of the invention do not exhibit a substantial increase in molecular weight (increased Mooney viscosity) when they are exposed to moisture during desolventization with steam or heated water, or storage in ambient environmental conditions, especially hot, humid conditions. Rather, the coupled polymer chains sterically inhibit the access of water to the hydrolyzable groups.

For a proper understanding of the invention, the following reaction schemes show first the hydrolysis reaction which occurs when siloxane-terminated polymers are exposed to moisture. This reaction (shown as Scheme I) is well known in the art and typically leads to the coupling of siloxane-terminated polymers through the subsequent formation of polymer-Si—O—Si-polymer bonds (Scheme II).

(Scheme I)

(Scheme II)

1)

-continued
and/or

2)

In contrast, the coupled polymer chains of the polymeric alkoxide compounds of the invention, illustrated in Scheme III below, have bulky polymer chains which sterically inhibit the access of water molecules to the hydrolyzable groups.

(Scheme III)

In (b) above, the polymer carbon-Si linkage may be an Si—R linkage, and in (c) above, one or more of the polymer carbon-Si linkages may be an Si—R linkage, as described above. Because of the presence of the bulky coupled polymer chains, the polymeric alkoxide compounds of the invention, illustrated in Scheme III above, are much less susceptible to hydrolysis and the undesirable accompanying increase in Mooney viscosity. The longer the polymer chains, the more difficult it is for the hydrolysis reaction to occur. Therefore, high molecular weight polymers are less likely to undergo hydrolysis and coupling of polymers than low molecular weight polymers. Of course, hydrolysis will eventually occur over time regardless of the polymer molecular weight, but not without difficulty. Thus, upon aging in storage prior to use, there will be only a slow increase in Mooney viscosity due to the formation of Si—O—Si bonds between the polymers.

The moisture-stabilized polymeric alkoxide compounds of the invention may, therefore, be stored under ambient environmental conditions, including hot and humid conditions, for up to about two years prior without substantially increasing in viscosity. More particularly, the polymer has an initial Mooney viscosity when prepared, and the viscosity of the polymer will not increase above the initial viscosity by more than about 50%, preferably not by more than about 25% and, more preferably, not by more than about 10% over the up to about two year time period.

A further advantage of the polymeric alkoxide compounds of the invention is exhibited during compounding of these chain-coupled polymers with a reinforcing filler, such as silica, carbon black, or mixtures of these, and other ingredients described below, to produce a sulfur vulcanizable elastomeric composition. In particular, in the presence of heat and moisture during compounding, the polymer chains uncouple due to hydrolysis, as illustrated below in Scheme IV, but, rather than forming polymer-AO—Si—OA-polymer bonds, the reactive polymer-AOH groups react with the silica filler, thus shielding the silanol groups on the silica filler and binding the silica to the rubber.

(Scheme IV)

Although, in this example the polymer chains are coupled by a silica (Si) group having a valence of 4, any of the metal or nonmetal atoms, M, derived from coupling agents containing silicon, tin, titanium, aluminum, arsenic, copper, calcium, zinc, phosphorus, boron, nitrogen or sulfur, may be used in embodiments of the invention. Hydrolysis of the coupled polymerAO—M bonds in the presence of heat and moisture during compounding, results in lower molecular weight of the polymers, resulting in a decrease in the viscosity of the mixture. In addition to cleavage of polymer AO—M bonds, when M is tin, lead, mercury or cadmium, cleavage of the polymer carbon-M bond(s) also occurs, resulting in a further decrease in the viscosity of the mixture when at least two polymer carbon-M bonds are present in the invention polymer.

As described further below, compounding of the invention polymeric alkoxide compounds with a reinforcing filler such as silica, carbon black or mixtures thereof results in better mixing efficiency (e.g., a shorter mixing time is required to achieve the required mixing energy), due to the progressive decrease in the Mooney viscosity of the mixture, in comparison to the mixing time of an equivalent vulcanizable elastomeric compound comprising the same polymer which is not coupled and has a similar weight average molecular weight to the invention polymer prior to coupling. The processability of both compounds will, however, be similar in downstream applications, e.g., extrusion, because the invention polymer will be decoupled, and both of the polymers will have the same weight average molecular weight.

Therefore, the invention also provides a method for improving mixing efficiency during compounding of an elastomer with a reinforcing filler, comprising the steps of providing a polymeric alkoxide compound having the formula disclosed herein; mixing the polymer in a mixer with a reinforcing filler selected from the group consisting of silica, carbon black, and mixtures thereof; providing a source of moisture; heating the mixture to a temperature of about 60° C. to about 200° C.; wherein during the mixing step up to "n" O—M groups are hydrolyzed in the presence of the moisture and heat resulting in uncoupling of up to "n" polymer chains and a decrease in the viscosity of the mixture, and wherein the mixing time to achieve a desired mix energy is decreased in comparison to the mixing time of an equivalent vulcanizable elastomeric compound comprising the same polymer, not coupled, and having a similar weight average molecular weight as the invention polymer prior to coupling. The improvement in mixing efficiency during compounding of the invention polymer is further evident at temperatures of about 90° to about 190° C., typically temperatures of about 105° to about 185° C., and especially temperatures of about 120° to about 180°. The source of moisture is typically moisture associated with the reinforcing filler, especially silica.

When the polymeric alkoxide compounds of the invention are prepared with alkoxide precursors containing bulky alkylene or carbonyl groups, steric hindrance to the entry of water molecules for hydrolysis of the AO—M bonds may be present. Consequently, when the alkylene or carbonyl groups are bulky, it may be necessary to add a catalyst. For example, a suitable catalyst is a strong base having a pK in the range of about 0.8 to about 12. For example, a suitable catalyst is a guanidine, such as, but not limited to, diphenyl guanidine (DPG.) Although the catalyst may be added to any stage of the compounding mixing process, it is preferably added to the master batch (initial) stage to promote uncoupling of the polymer chains at the beginning of the compounding process.

Vulcanizable elastomeric compositions of the invention can be prepared by compounding or mixing the polymeric alkoxide compounds herein with silica, preferably precipitated silica (silicon dioxide), carbon black, or mixtures of silica and carbon black, in addition to other conventional rubber additives including, for example, other fillers, plasticizers, antioxidants, curing agents and the like, using standard rubber mixing equipment and procedures. For example, the vulcanizable elastomeric composition of the present invention can be obtained by milling the components by using a milling apparatus, such as a mill, an internal mixer, and the like. Such elastomeric compositions, when vulcanized using conventional rubber vulcanization conditions, exhibit reduced hysteresis, which means a product having increased rebound, decreased rolling resistance and lessened heat build-up when subjected to mechanical stress. Products including tires, power belts and the like are envisioned. Decreased rolling resistance is, of course, a useful property for pneumatic tires, both radial as well as bias ply types and thus, the vulcanizable elastomeric compositions of the present invention can be utilized to form treadstocks for such tires. Pneumatic tires can be made according to the constructions disclosed in U.S. Pat. Nos. 5,866,171; 5,876,527; 5,931,211; and 5,971,046, the disclosures of which are incorporated herein by reference. The composition can also be used to form other elastomeric tire components such as subtreads, black sidewalls, body ply skims, bead fillers and the like.

The polymeric alkoxide compounds of the present invention can be utilized as 100 parts of the rubber in the treadstock compound, or they can be blended with any conventionally employed treadstock rubber which includes natural rubber, synthetic rubber and blends thereof. Such rubbers are well known to those skilled in the art and include synthetic polyisoprene rubber, styrene/butadiene rubber (SBR), polybutadiene, butyl rubber, neoprene, ethylene/propylene rubber, ethylene/propylene/diene rubber (EPDM), acrylonitrile/butadiene rubber (NBR), silicone rubber, the fluoroelastomers, ethylene acrylic rubber, ethylene vinyl acetate copolymer (EVA), epichlorohydrin rubbers, chlorinated polyethylene rubbers, chlorosulfonated polyethylene rubbers, hydrogenated nitrile rubber, tetrafluoroethylene/propylene rubber and the like. When the polymers of the present invention are blended with conventional rubbers, the amounts can vary widely with a lower limit comprising about 10 to 20 percent by weight of the total rubber. The minimum amount will depend primarily upon the degree of hysteresis reduction desired. Thus, the compounds can contain 10 to 100 percent by weight of the inventive polymeric alkoxide compound, with the balance, if any, being a conventional rubber.

The polymeric alkoxide compounds are preferably compounded with reinforcing fillers, such as silica, carbon black or a combination of both silica and carbon black. Examples of silica fillers which may be used in the vulcanizable elastomeric composition of the invention include wet silica (hydrated silicic acid), dry silica (anhydrous silicic acid), calcium silicate, and the like. Other equivalent useful fillers include aluminum silicate, clay, talc, calcium carbonate, basic magnesium carbonate hydrated alumina, diatomaceous earth, barium sulfate, mica, aluminum sulfate, titanium oxide, aluminum hydroxide, aluminum oxide and the like. Among these, precipiated amorphous wet-process, hydrated silicas are preferred. These silicas are so-called because they are produced by a chemical reaction in water, from which they are precipitated as ultrafine, spherical particles. These primary particles strongly associate into aggregates, which in turn combine less strongly into agglomerates. The surface area, as measured by the BET method gives the best measure of the reinforcing character of different silicas. For silicas of interest for the present invention, the surface area should be about 32 to about 400 $m^2/g$, with the range of about 100 to about 250 $m^2/g$ being preferred, and the range of about 150 to about 220 $m^2/g$ being most preferred. The pH of the silica filler is generally about 5.5 to about 7 or slightly over, preferably about 5.5 to about 6.8.

Silica can be employed in the amount of about 1 part to about 100 parts per 100 parts of the polymeric alkoxide compound (phr), preferably in an amount from about 5 to about 80 phr. The useful upper range is limited by the high viscosity imparted by fillers of this type. Some of the commercially available silicas which may be used include, but are not limited to, Hi-Sil® 190, Hi-Sil® 210, Hi-Sil® 215, Hi-Sil®233, Hi-Sil® 243, and the like, produced by PPG Industries. A number of useful commercial grades of different silicas are also available from DeGussa Corporation (e.g., VN2, VN3), Rhone Poulenc (e.g., Zeosil 1165MP), and J.M. Huber Corporation.

The polymeric alkoxide compounds can be compounded with all forms of carbon black in amounts ranging from about 5 to 50 parts by weight, per 100 parts of polymer (phr), with less than about 35 phr being preferred. The carbon blacks may include any of the commonly available, commercially-produced carbon blacks, but those having a surface area (EMSA) of at least 20 $m^2/g$ and, more preferably, at least 35 $m^2/g$ up to 200 $m^2/g$ or higher are preferred. Surface area values used in this application are determined by ASTM test D-1765 using the cetyltrimethylammonium bromide (CTAB) technique. Among the useful carbon blacks are furnace black, channel blacks and lamp blacks. More specifically, examples of useful carbon blacks include super abrasion furnace (SAF) blacks, high abrasion furnace (HAF) blacks, fast extrusion furnace (FEF) blacks, fine furnace (FF) blacks, intermediate super abrasion furnace (ISAF) blacks, semi-reinforcing furnace (SRF) blacks, medium processing channel blacks, hard processing channel blacks and conducting channel blacks. Other carbon blacks which may be utilized include acetylene blacks. Mixtures of two or more of the above blacks can be used in preparing the carbon black products of the invention. Typical suitable carbon blacks are N-110, N-220, N-339, N-330, N-351, N-550, N-660, as designated by ASTM D-1765-82a. The carbon blacks utilized in the preparation of the vulcanizable elastomeric compositions of the invention may be in pelletized form or an unpelletized flocculent mass. Preferably, for more uniform mixing, unpelletized carbon black is preferred.

It is readily understood by those having skill in the art that the rubber composition would be compounded by methods generally known in the rubber compounding art, such as mixing the various sulfur-vulcanizable constituent polymer (s) with various commonly used additive materials such as for example, curing aids, such as sulfur, activators, retarders and accelerators, processing additives, such as oils, resins, including tackifying resins, plasticizers, pigments, fillers, fatty acid, zinc oxide, waxes, antioxidants and antiozonants, peptizing agents. As known to those skilled in the art, depending on the intended use of the sulfur vulcanizable and sulfur vulcanized material (rubbers), the additives mentioned above are selected and commonly used in conventional amounts.

Typical amounts of tackifer resins, if used, comprise about 0.5 to about 10 phr, usually about 1 to about 5 phr. Typical amounts of processing aids comprise about 1 to about 50 phr. Such processing aids can include, for example, aromatic, naphthenic, and/or paraffinic processing oils. Typical amounts of antioxidants comprise about 1 to about 5 phr. Representative antioxidants may be, for example diphenyl-p-phenylenediamine and others, such as for example, those disclosed in the *Vanderbilt Rubber Handbook* (1978), pages 344–346. Typical amounts of antiozonants comprise about 1 to 5 phr.

Typical amounts of fatty acids, if used, which can include stearic acid, palmitic acid, linoleic acid or mixtures of one or more fatty acids, can comprise about 0.5 to about 3 phr. Typical amounts of zinc oxide comprise about 2 to about 5 phr. Typical amounts of waxes comprise about 1 to about 2 phr. Often microcrystalline waxes are used. Typical amounts of peptizers, if used, comprise about 0.1 to about 1 phr. Typical peptizers may be, for example, pentachlorothiophenol and dibenzamidodiphenyl disulfide.

The vulcanization is conducted in the presence of a sulfur vulcanizing agent. Examples of suitable sulfur vulcanizing agents include "rubbermaker's" soluble sulfur; sulfur donating vulcanization agents, such as an amine disulfide, polymeric polysulfide or sulfur olefin adducts; and insoluble polymeric sulfur. Preferably, the sulfur vulcanizing agent is soluble sulfur or mixtures of soluble and insoluble polymeric sulfur. The sulfur vulcanizing agents are used in an amount ranging from about 0.1 to about 10 phr, often in the range of about 0.5 to about 5 phr, with a range of about 1.5 to about 3.5 phr being preferred.

Accelerators are used to control the time and/or temperature required for vulcanization and to improve properties of the vulcanizate. The vulcanization accelerators used in the present invention are not particularly limited. Examples include thiazol vulcanization accelerators, such as 2-mercaptobenzothiazol, dibenzothiazyl disulfide, N-cyclohexyl-2-benzothiazyl-sulfenamide (CBS), N-tert-butyl-2-benzothiazyl sulfenamide (TBBS), and the like; and guanidine vulcanization accelerators, such as diphenyl guanidine and the like. The amount of the vulcanization accelerator used is about 0.1 to about 5 phr, preferably about 0.2 to about 3 phr.

The vulcanizable elastomeric composition of the present invention can be obtained by mixing the components by using a milling apparatus, such as a mill, an internal mixer, and the like. The ingredients are typically mixed in two or more stages, consisting of at least a "master batch" stage in which at least a portion of the polymeric alkoxide compound, silica, carbon black (if used), and other ingredients are mixed at a high temperature, which may be from about 165° C. to about 200° C., and a lower temperature "final stage", in which the curing agents are typically added. There may also be intermediate mixing stages in which the mixture is re-milled with or without the addition of ingredients. The mixing temperature and mixing times may vary from stage to stage, as is known to those skilled in the art.

EXAMPLES

The following examples illustrate methods of preparation of the polymeric alkoxide compounds of the present invention, and their use in compounding formulations. However, the examples are not intended to be limiting, as other methods for preparing these compounds and different compounding formulations may be determined by those skilled in the art. Thus, the invention is not limited to the specific monomers, reactants, initiators, alkoxide precursor compounds, and invention compounds disclosed, nor to any particular modifier or solvent. Similarly, the examples have been provided merely to demonstrate the practice of the subject invention and do not constitute limitations of the invention. Those skilled in the art may readily select other monomers, reactants, initiators, alkoxide precursor compounds, coupling agents, and the like, and process conditions, according to the disclosure made herein above. Thus, it is believed that any of the variables disclosed herein can readily be determined and controlled without departing from the scope of the invention herein disclosed and described.

In each of the following polymerization examples, the exemplary styrene-butadiene rubber (SBR) was prepared under anhydrous and anaerobic conditions in a jacketed, stainless steel reactor fit with a stirrer.

Example 1

This example illustrates the synthesis of, and a comparison of physical properties between, an invention chain-coupled alkylene oxide-modified polymer and a comparative equivalent polymer in which the polymer chains have not been alkoxide-modified or coupled. This example also illustrates improvements in both mixing efficiency and filler dispersion during compounding of the invention polymer.
(a) Synthesis of Ethylene Oxide-Modified/$SiCl_4$ Coupled SBR To a one gallon nitrogen-purged reactor was charged 0.19 kilograms (kg) hexane, 0.455 kg of 33.6 percent by weight styrene in hexane, and 1.57 kg of 27.7 percent by weight butadiene in hexane. Then 0.49 milliliters (ml) of 0.6 molar (M) potassium t-butylamylate, 0.21 ml of 1.6 M 2-2'-di (tetrahydrolrryl) propane, and 3.26 ml of 1.6 M n-butyl lithium were charged into the reactor, and the jacket temperature was set to 122° F. After 140 minutes, half (1.14 kg) of the resulting polymer cement was discharged, terminated with isopropyl alcohol and treated with di-t-butyl-p-cresol (DBPC) solution (80 grams of DBPC in 700 ml hexane). The DBPC solution served as an antioxidant to prevent degradation of the polymer. The sample was then desolventized by drum drying. This sample, which was not ethylene oxide-treated or polymer chain-coupled served as a control (C-1) sample for comparison with the ethylene oxide-treated and polymer chain-coupled sample prepared from the same polymer, as now described below.

To the remaining 1.14 kg of polymer cement was added 4.89 ml of 0.5 M ethylene oxide in hexane. After 15 minutes, 1.22 ml of 0.5 M silicon tetrachloride was added. The mixture was stirred for 15 minutes, and then the cement was removed from the reactor, treated with the antioxidant, coagulated with isopropyl alcohol, and drum dried. This sample is a polymeric alkoxide compound of the invention, designated as Example 1 (E-1), in Table 1 below.

(b) Comparison of Physical Properties of the Control and Invention Gum Polymers

A comparison of the properties of the invention polymeric alkoxide compound E-1) and the equivalent control polymer (C-1) is illustrated in Table 1.

TABLE 1

Comparison of the Physical Properties of an Invention Polymeric Alkoxide Compound and an Equivalent Non-Invention Control Polymer

| Polymer Property | Control Polymer (C-1) | Invention Polymer (E-1) |
|---|---|---|
| $M_w$ (× $10^5$), g/mol | 1.21 | 1.78 |
| $M_n$ (× $10^5$), g/mol | 1.07 | 1.14 |
| Polydispersity | 1.13 | 1.56 |
| Percent Coupling | 0 | 31.2 |
| Tg (° C.) | −56.8 | −56.6 |
| $ML_{1+4}$ | 13.7 | 28.3 |
| % Styrene | 27.8 | 27.6 |
| % Block Styrene | 12.9 | 13.0 |
| % 1,4-Butadiene | 54.4 | 54.5 |
| % 1,2-Butadiene | 17.9 | 17.9 |

As expected, the number average molecular weight ($M_n$), the polydispersity (i.e., the ratio of the weight average molecular weight to the number average molecular weight), and the Mooney viscosity ($ML_{1+4}$) of the ethylene-oxide modified, chain-coupled polymer are all higher than that of the control, unmodified polymer, and are within a desirable range of values.

(c) Compounding of the Polymers to Form Control and Invention Vulcanizable Elastomeric Compounds The control (C-1) and ethylene oxide-modified, coupled (E-1) polymers were compounded according to the formulation presented in Table 2. Each rubber compound (Control, C-1' and Invention, E-1') was prepared in two stages, a master batch stage and a final stage. The master batch formulation was mixed in a 65 gram Brabender mixer equipped with a torque integrator operating at 60 RPM and 128° C. The ingredients were added and the mixing was continued until a torque integration of approximately 67,500 meter-grams was achieved. The mixing time and achieved temperature were then noted.

The final stage formulation was mixed by adding the resulting master batch mixture and curatives into the mixer operating at 88° C. and 40 RPM. The final product was removed from the mixer after a torque integration of approximately 35,900 meter-grams was achieved. The final product was then sheeted and cured at 165° C. for 20 minutes in standard molds placed in a hot press.

TABLE 2

Compounding Ingredients (phr)

| | Control Compound C-1' | Invention Compound E-1' |
|---|---|---|
| Master Batch Stage | | |
| Control Polymer (C-1) | 75 | 0 |
| Invention Polymer (E-1) | 0 | 75 |
| Natural Rubber | 25 | 25 |
| Antioxidant | 0.95 | 0.95 |
| Fatty Acid | 1.5 | 1.5 |
| Carbon Black | 32 | 32 |
| Silica | 30 | 30 |
| Napthenic Oil + Wax | 16 | 16 |
| Total | 180.45 | 180.45 |
| Final Stage | | |
| Master Batch Mixture | 180.45 | 180.45 |
| Zinc Oxide | 2.5 | 2.5 |
| Accelerators | 2.25 | 2.25 |
| Sulfur | 1.7 | 1.7 |
| Total | 186.9 | 186.9 |

(d) Physical Properties of the Control and Invention Vulcanizable Elastomeric Compounds The physical properties of the control (C-1') and invention (E-1') compounds are illustrated in Table 3. The Mooney viscosity was measured according to ASTM D-1646; the tensile properties were obtained according to ASTM D-412; ring tear was determined according to ASTM D-624; and Shore A Hardness was determined according to ASTM D-2240. All other tests were conducted by conventional methods known to those skilled in the art.

As illustrated in Table 3, the Mooney viscosity ($ML_{1+4}$) of the invention vulcanizable elastomeric compound (E-1') was greater than that of the control compound (C-1'), indicating that the uncoupling of polymer chains was not complete over the course of mixing. However, the mixing time required to achieve the target temperature was 20 seconds faster for the invention compound than the control compound, indicating about a 7% increase in the efficiency of mixing of the invention compound compared to the control compound. The invention compound also exhibited a better filler dispersion, illustrated by the dispersion index, compared to the control compound.

TABLE 3

| | Control Compound C-1' | Invention Compound E-1' |
|---|---|---|
| $ML_{1+4}$ @ 130° C. | 68.3 | 75.1 |
| MONSANTO CURE @ 165° C. | | |
| ML (min) | 4.47 | 4.44 |
| MH (min) | 19.56 | 18.9 |
| Ts2 (min) | 1.27 | 1.14 |
| Tc90 (min) | 21.11 | 19.03 |
| Tan δ @ MH | 0.198 | 0.173 |
| Time to 175° C. | 5 min. | 4.66 min. |
| RING TENSILE @ 24° C. | | |
| 50% Modulus, psi | 172 | 161 |
| 100% Modulus, psi | 238 | 234 |
| 200% Modulus, psi | 416 | 440 |
| 300% Modulus, psi | 651 | 740 |
| Tensile strength, psi | 1791 | 2217 |
| % Elongation | 718 | 683 |

TABLE 3-continued

|  | Control Compound C-1' | Invention Compound E-1' |
|---|---|---|
| RING TENSILE @ 100° C. | | |
| 50% Modulus, psi | 110 | 116 |
| 100% Modulus, psi | 164 | 182 |
| 200% Modulus, psi | 276 | 334 |
| Tensile strength, psi | 811 | 1132 |
| % Elongation | 559 | 564 |
| Ring Tear @ 171° C., ppi | 210 | 212 |
| Pendulum Rebound @ 24° C. | 44.6 | 45.6 |
| Pendulum Rebound @ 50° C. | 47.6 | 49.8 |
| Lambourn @ 65%, INDEX | 1.00 | 1.01 |
| Wet Stanley London (#/std) | 59 | 62 |
| Shore A, @ RT (peak) | 55.7 | 54 |
| Dispersion Index #1, % | 84.6 | 91.9 |
| RHEOMETRICS @ 3.14 rad/sec | | |
| Tan δ @ 7% E & 24° C. | 0.253 | 0.232 |
| Δ G' (MPa) @ 24° C. | 7.233 | 5.108 |
| G' (MPa) @ 14.5% E & 24° C. | 3.137 | 2.899 |
| Tan δ @ 7% E & 65° C. | 0.260 | 0.225 |
| Δ G' (MPa) @ 65° C. | 4.368 | 5.052 |
| G' (MPa) @ 14.5% E & 65° C. | 2.178 | 2.161 |

Example 2

This example illustrates the synthesis of, and a comparison of physical properties between, an invention alkylene oxide-modified, chain-coupled polymer, and an equivalent comparative chain-coupled polymer having carbon-silicon bonds. This example also illustrates a decrease in the compound viscosity of the vulcanizable elastomeric compound formed with the invention polymer. Carbon black is employed as the only reinforcing filler.

(a) Synthesis of $SiCl_4$ Coupled Polymer

To a one gallon reactor was charged 0.24 kg hexane, 0.43 kg of 33.0 percent by weight styrene in hexane, and 1.55 kg of 27.4 percent by weight butadiene in hexane. Then, 0.66 ml of 1.6 M 2-2'-di(tetrahydrofuryl) propane in hexane and 2.36 ml of 1.6 M n-butyl lithium in hexane were charged into the reactor and the jacket temperature was set at 110° F. After 220 minutes, 942.5 g of the live polymer cement was removed from the reactor and discharged into a nitrogen-purged bottle and coupled with 0.786 ml of 0.5 M silicon tetrachloride. To the coupled polymer was added 10 ml of DBPC in hexane (as described in Example 1). The polymer was then coagulated with isopropanol and drum dried. The coupled polymer properties were: $M_n=2.40\times10^5$; polydispersity=1.60; percent chain coupling=64.5%; and $T_g=-40.3°$ C. This sample is designated control (C-2) in the tables below.

(b) Synthesis of Ethylene Oxide Modified/$SiCl_4$-Coupled Styrene-Butadiene Rubber The cement remaining in the reactor (approximately 1.33 kg) was treated with 4.42 ml of 0.5 M ethylene oxide in hexane. After 20 minutes, 1.11 ml of 0.5 M silicon tetrachloride was added to the reactor. The cement was then discharged from the reactor, coagulated with isopropanol, treated with DBPC (as described above), and drum dried. The coupled polymer properties were: $M_n=2.10\times10^5$; polydispersity=1.53; percent chain coupling=45.04%; and $T_g=-40.3°$ C. This sample is a chain-coupled polymeric alkoxide compound and is designated a example E-2 in the tables below.

(c) Compounding of the Polymers to Form Control and Invention Vulcanizable Elastomeric Compounds The control coupled polymers (C-2) and the ethylene oxide-modified, coupled (E-2) polymers were compounded according to the formulation presented in Table 4. Each rubber compound (Control, C-2' and Invention, E-2') was prepared in two stages, a master batch stage and a final stage. The master batch formulation was mixed in a 300 gram Brabender mixer equipped with a torque integrator operating at 60 RPM and 128° C. The ingredients were added and the mixing was continued until a torque integration of approximately 88,000 meter-grams was achieved. The mixing time and achieved temperature were then noted.

The final stage formulation was mixed by adding the master batch mixture and curatives into the mixer operating at 88° C. and 40 RPM. The final product was removed from the mixer after a torque integration of approximately 36,200 meter-grams was achieved. The final product was then sheeted and cured at 165° C. for 20 minutes in standard molds placed in a hot press.

TABLE 4

| Compounding Ingredients (phr) | | |
|---|---|---|
|  | Invention Compound E-2' | Control Compound C-2' |
| Master Batch Stage | | |
| Control Polymer (C-2) | 0 | 100 |
| Invention Polymer (E-2) | 100 | 0 |
| Carbon Black | 50 | 50 |
| Fatty Acid | 2.0 | 2.0 |
| Antioxidant | 1.0 | 1.0 |
| Wax + Oil | 10 | 10 |
| Total | 163 | 163 |
| Final Stage | | |
| Master Batch Mixture | 163 | 163 |
| Zinc Oxide | 3.0 | 3.0 |
| Accelerators | 1.5 | 1.5 |
| Sulfur | 1.3 | 1.3 |
| Total | 168.8 | 168.8 |

(d) Physical Properties of the Control and Invention Vulcanizable Elastomeric Compounds

TABLE 5

|  | Invention Compound E-2' | Control Compound C-2' |
|---|---|---|
| $ML_{1+4}$ (130° C.) | 68.0 | 88.9 |
| MONSANTO CURE @ 165° C. | | |
| ML | 2.27 | 3.44 |
| MH | 16.31 | 16.52 |
| ts2 | 1 | 1.01 |
| tc90 | 5.38 | 5.57 |
| tan δ @ MH | 0.06 | 0.062 |
| Torque Integration (Master) | 87984 | 88377 |
| Torque Integration (Final) | 36332 | 36106 |
| Time to 180° C. (Master) | 6 min. | 5 min. 45 sec. |
| Time to 116° C. (Final) | 1 min. 5 sec. | 1 min. 5 sec. |
| RING TENSILE @ 24° C. | | |
| 50% Modulus, psi | 224 | 209 |
| 100% Modulus, psi | 425 | 413 |
| 200% Modulus, psi | 1017 | 1026 |
| 300% Modulus, psi | 1798 | 1806 |
| Tensile strength, psi | 2877 | 2676 |
| % Elongation | 430 | 410 |
| RING TENSILE @ 100° C. | | |
| 50% Modulus, psi | 145 | 145 |
| 100% Modulus, psi | 274 | 281 |
| 200% Modulus, psi | 699 | 757 |

TABLE 5-continued

|  | Invention Compound E-2' | Control Compound C-2' |
|---|---|---|
| Tensile strength, psi | 1570 | 1603 |
| % Elongation | 349 | 337 |
| Tear Strength, (ppi, 171° C.) | 98.8 | 103.1 |
| Shore A, @ RT (peak) | 68.2 | 69 |
| Shore A, @ 65° C.) (peak) | 62.3 | 63.7 |
| Wet Stanley London | 63 | 60 |
| Pendulum Rebound (23° C.) | 41.2 | 49.8 |
| Pendulum Rebound (50° C.) | 40.8 | 50 |
| Lambourn @ 65%, g lost | 0.1042 | 0.0946 |
| Lambourn @ 65%, INDEX | 1.00 | 1.10 |
| RHEOMETRICS @ 3.14 rad/sec | | |
| tan δ @ 7% E & 24° C. | 0.199 | 0.196 |
| G" (MPa) @ 7% E & 24° C. | 0.581 | 0.643 |
| Δ G' (MPa) @ 24° C. | 2.708 | 3.194 |
| G' (MPa) @ 14.5% E & 24° C. | 2.417 | 2.714 |
| tan δ @ 7% E & 65° C. | 0.152 | 0.149 |
| G" (MPa) @ 7% E & 65° C. | 0.358 | 0.349 |
| Δ G' (MPa) @ 65° C. | 1.687 | 1.699 |
| G' (MPa) @ 14.5% E & 65° C. | 2.061 | 2.054 |

As illustrated in Table 5, the compound Mooney viscosity ($ML_{1+4}$) of the invention compound (E-2'), employing the ethylene oxide-modified chain-coupled compound (E-2), is 20.9 units lower than that of the control compound (C-2') employing the control polymer (C-2) having polymer carbon-silicon bonds only. Carbon silicon bonds are not expected to be cleaved under normal mixing conditions. The lower viscosity of the E-2' compound indicates that cleavage of some of the (polymer)$CH_2CH_2O$—Si bonds is occurring under the above-described mixing conditions. The fact that there is no silica reinforcing filler in these compounds indicates that the (PAO)—Si bonds can be cleaved in the presence of the carbon black filler alone. Without being bound by theory, it is believed that phenolic groups present in carbon black may interact with the (PAO)—Si bond and produce cleavage of the bond.

Example 3

This example illustrates a comparison of three different silicon tetrachloride-coupled invention polymeric alkoxide compounds, with a comparative tin-coupled polymer, and a alkoxysilane (tetraethoxysilane, TEOS)-endcapped polymer.

(a) Synthesis of $PSi(OP)_3$ Styrene-Butadiene Rubber (P~83,000 Dalton $M_n$)

Each polymer chain of this synthesized polymer has a number average molecular weight of approximately 83,000 daltons. This invention polymeric alkoxide compound is designated "E-3" in the tables below.

To a one gallon reactor was charged 0.41 kg of 33.0 percent by weight styrene in hexane, and 1.81 kg of 21.5 percent by weight of butadiene in hexane. Then, 0.28 ml of 1.6 M 2-2'-di(tetrahydrofuryl) propane in hexane, 0.63 ml of 0.6 M potassium t-amylate in hexane, 1.42 ml of 3.54 M hexamethyleneimine, and 3.93 ml of 1.6 M n-butyl lithium in hexane were charged into the reactor, and the jacket temperature was set at 122° F. After 50 minutes, 9.43 ml of 0.5 M ethylene oxide in hexane was added to the reactor. Fifteen minutes later, 3.14 ml of 0.50 M silicon tetrachloride was added to the reactor. After 15 additional minutes, the cement was discharged from the reactor, coagulated with isopropanol, treated with DBPC, and drum dried. The properties of this polymer were: $ML_{1+4}$=27.9; $M_n$=1.21×10$^5$; styrene content=28.7%; block styrene content=11.9%; vinyl content=23.7%; 1,4-butadiene content=54.1%; and $T_g$=−48.4° C.

(b) Synthesis of $Si(OP)_4$ (P~150,000 Dalton $M_n$)

Each polymer chain of this synthesized polymer has a number average molecular weight of approximately 150,000 daltons. This invention polymeric alkoxide compound is designated "E-4" in the tables below To a one gallon reactor was charged 0.41 kg of 33.0 percent by weight of styrene in hexane, and 1.81 kg of 21.5 percent by weight of butadiene in hexane. Then, 0.15 ml of 1.6 M 2-2'-di(tetrahydrofuryl) propane in hexane, 0.35 ml of 0.6 M potassium t-amylate in hexane, 0.79 ml of 3.54 M hexamethyleneimine, and 2.18 ml of 1.6 M n-butyl lithium in hexane were charged into the reactor, and the jacket temperature was set at 122° F. After 52 minutes, 6.99 ml of 0.5 M ethylene oxide in hexane was added to reactor. Fifteen minutes later, 1.75 ml of 0.50 M silicon tetrachloride was added to the reactor. After 15 additional minutes, the cement was discharged from the reactor, coagulated with isopropanol, treated with DBPC, and drum dried. The properties of this polymer were: $ML_{1+4}$=43.9; $M_n$=1.47×10$^5$, polymer chains coupled=19.1%; styrene content=28.2%; block styrene content=13.3%; vinyl content=16.9%; 1,4-butadiene content=54.9%; and $T_g$=−56.4° C.

(c) Synthesis of $PSi(OP)_3$ (P~150,000 Dalton $M_n$)

Each polymer chain of this synthesized polymer has a number average molecular weight of approximately 150,000 daltons. This invention polymeric alkoxide compound is designated "E-5" in the tables below.

To a one gallon reactor was charged 0.41 kg of 33.0 percent by weight styrene in hexane, and 1.81 kg of 21.5 percent by weight butadiene in hexane. Then, 0.15 ml of 1.6 M 2-2'-di(tetrahydrolrryl) propane in hexane, 0.35 ml of 0.6 M potassium t-amylate in hexane, 0.79 ml of 3.54 M hexamethyleneimine and 2.18 ml of 1.6 M n-butyl lithium in hexane were charged into the reactor, and the jacket temperature was set at 122° F. After 50 minutes, 5.24 ml of 0.5 M ethylene oxide in hexane was added to the reactor. Fifteen minutes later, 1.75 ml of 0.50 M silicon tetrachloride was added to the reactor. After 10 additional minutes, the cement was discharged from the reactor, coagulated with isopropanol, treated with DBPC, and drum dried. The properties of the polymer were: $ML_{1+4}$=71.3; $M_n$=1.75×10$^5$; coupled polymer chains=27.2%; styrene content=28.3%; block styrene content=13.4%; vinyl content=16.6%; 1,4-butadiene content=55.1%; and $T_g$=−56.2° C.

(d) Synthesis of Comparison TEOS-Terminated Polymer

This siloxane-terminated polymer was synthesized as a comparative example in the tables below and is designated "TEOS-1".

To a one gallon reactor was charged 0.41 kg of 33.0 percent by weight styrene in hexane, and 1.81 kg of 21.5 percent by weight butadiene in hexane. Then, 0.28 ml of 1.6 M 2-2'-di(tetrahydrofuryl) propane in hexane, 0.63 ml of 0.6 M potassium t-amylate in hexane, 1.42 ml of 3.54 M hexamethyleneimine and 3.93 ml 1.6 M n-butyl lithium in hexane were charged into the reactor and the jacket temperature was set at 122° F. After 110 minutes, 2.20 ml of 0.25 M silicon tetrachloride in hexane was added to reactor. Thirteen minutes later, 2.53 ml of 1.12 M tetraethoxyorthosilicate was added to the reactor. After 15 additional minutes, the cement was discharged from the reactor, coagulated with isopropanol, treated with DBPC, and drum dried. The properties of this tetraethoxysilane (TEOS)-terminated polymer were: $ML_{1+4}$=35.1; polymer chain coupling=56.12%; $M_n$=1.29×10$^5$; styrene content=27.5%; block styrene content=10.2%; vinyl content=20.2%; 1,4-butadiene content=52.3%; and $T_g$=−52.6° C.

(e) Comparative Tin-Terminated Polymer

For comparison purposes, a tin-coupled polymer sold commercially by Bridgestone/Firestone Corporation was obtained. The properties of the SBR tin-coupled polymer are: $ML_{1+4}$=72; styrene content=20%; vinyl content=59%; and $T_g$=−33° C. This polymer is designated TC-1 in the tables below.

(f) Compounding of the Polymers to Form Invention and Comparison Vulcanizable Elastomeric Compounds The formulations for the compounding are presented in Table 6. Each rubber compound was prepared in three stages namely, master batch stage, remill stage, and final stage. The ingredients in the master batch stage were mixed in a 300 g Brabender mixer operating at 60 RPM and 128° C. The ingredients were added and the mixing continued until a temperature of 175° C. was achieved. The time was then noted.

In the remill stage, the master batch mixture and the Si-69 on carbon black were mixed in the mixer operating at 105° C. and 60 RPM. The remill material was removed from the mixer after a temperature of 140° C. was achieved.

In the final stage, the remill material and curatives were mixed in the mixer operating at 88° C. and 40 RPM. The final material was removed from the mixer after a temperature of 118° C. was achieved. The final compounds were then sheeted and cured at 165° C. for 20 minutes in standard molds placed in a hot press.

TABLE 6

Compounding Ingredients

| | phr |
|---|---|
| Master Batch Stage | |
| SBR Polymer (Invention or Comparison) | 75 |
| Natural Rubber | 25 |
| Antioxidant | 0.95 |
| Fatty Acid | 1.5 |
| Carbon Black | 32 |
| Silica | 30 |
| Oil + Wax | 16 |
| Total | 180.45 |
| Remill Stage | |
| Master Batch Mixture | 180.45 |
| 50% Si-69 on Carbon Black | 6.00 |
| Total | 186.45 |
| Final Stage | |
| Remill Mixture | 186.45 |
| Zinc Oxide | 2.5 |
| Accelerator | 2.25 |
| Sulfur | 1.7 |
| Total | 192.9 |

TABLE 7

Comparison of Invention and Comparative Polymers

| Polymer | TC-1 | TEOS-1 | E-3 | E-4 | E-5 |
|---|---|---|---|---|---|
| TC-1 (phr) | 75 | 0 | 0 | 0 | 0 |
| TEOS-1 (phr) | 0 | 75 | 0 | 0 | 0 |
| 83 k PSi(OP)$_3$ (phr) | 0 | 0 | 75 | 0 | 0 |
| 150 k Si(OP)$_4$ (phr) | 0 | 0 | 0 | 75 | 0 |
| 150 k PSi(OP)$_3$ (phr) | 0 | 0 | 0 | 0 | 75 |
| Physical Test Results | | | | | |
| ML$_{1+4}$ (130° C.) | 58.4 | 57.5 | 59 | 71.2 | 91.3 |
| MONSANTO CURE @ 165° C. | | | | | |
| ML | 2.32 | 2.54 | 2.44 | 2.88 | 3.72 |
| MH | 18.19 | 15.29 | 17.7 | 17.99 | 18.75 |
| Ts2 | 2.03 | 1.81 | 1.66 | 1.68 | 1.59 |
| Tc90 | 7.67 | 4.77 | 4.41 | 4.05 | 3.97 |
| tan δ @ MH | 0.049 | 0.082 | 0.066 | 0.069 | 0.065 |
| Time to 175° C. (Master) | 5 min. | 5 min. | 4.5 min. | 4.5 min. | 4 min. |
| Time to 140° C. (Final) | 2.25 min. | 2 min. | 1 min. | 1 min. | 1 min. |
| RING TENSILE @ 24° C. | | | | | |
| 50% Modulus, psi | 208 | 185 | 199 | 182 | 196 |
| 100% Modulus, psi | 407 | 327 | 368 | 323 | 345 |
| 200% Modulus, psi | 1033 | 812 | 944 | 825 | 881 |
| 300% Modulus, psi | 1897 | 1575 | 1804 | 1663 | 1808 |
| Tensile strength, psi | 2679 | 2591 | 2973 | 3101 | 3185 |
| % Elongation | 388 | 422 | 432 | 460 | 436 |
| RING TENSILE @ 100° C. | | | | | |
| 50% Modulus, psi | 180 | 159 | 181 | 173 | 188 |
| 100% Modulus, psi | 354 | 292 | 339 | 316 | 339 |
| 200% Modulus, psi | 902 | 695 | 827 | 758 | 816 |
| Tensile strength, psi | 1323 | 1213 | 1452 | 1566 | 1543 |

TABLE 7-continued

Comparison of Invention and Comparative Polymers

| Polymer | TC-1 | TEOS-1 | E-3 | E-4 | E-5 |
|---|---|---|---|---|---|
| % Elongation | 260 | 289 | 293 | 322 | 319 |
| Tear Strength (ppi, 171° C.) | 159 | 148 | 153 | 165 | 175 |
| Shore A, @ RT (peak) | 71.2 | 67.4 | 70.8 | 69.1 | 68.9 |
| Shore A, @ 100° C. (peak) | 66.1 | 63 | 66.2 | 65.7 | 65.9 |
| Wet Stanley London | 76 | 71 | 72 | 69 | 67 |
| Pendulum Rebound (23° C.) | 45.2 | 49.6 | 46 | 49.2 | 49.8 |
| Pendulum Rebound (50° C.) | 51.2 | 53.4 | 51.2 | 53.6 | 54.6 |
| Lambourn @ 65%, g lost | 0.1497 | 0.1273 | 0.1371 | 0.1276 | 0.1315 |
| Lambourn @ 65%, INDEX | 1.00 | 1.18 | 1.09 | 1.17 | 1.14 |
| Dispersion Index | 94.7 | 95.3 | 96.7 | 98.0 | 92.4 |
| RHEOMETRICS @ 3.14 rad/sec | | | | | |
| tan δ @ 7% E & 24° C. | 0.158 | 0.155 | 0.159 | 0.151 | 0.156 |
| G" (MPa) @ 7% E & 24° C. | 0.4472 | 0.4068 | 0.4944 | 0.4789 | 0.4934 |
| Δ G' (MPa) @ 24° C. | 2.515 | 1.715 | 2.557 | 2.400 | 2.731 |
| G' (MPa) @ 14.5% E & 24° C. | 2.342 | 2.2818 | 2.6141 | 2.7063 | 2.6823 |
| tan δ @ 7% E & 65° C. | 0.1166 | 0.1244 | 0.111 | 0.1089 | 0.1176 |
| G" (MPa) @ 7% E & 65° C. | 0.297 | 0.284 | 0.289 | 0.266 | 0.324 |
| Δ G' (MPa) @ 65° C. | 1.689 | 1.062 | 1.542 | 1.310 | 1.831 |
| G' (MPa) @ 14.5% E & 65° C. | 2.218 | 2.059 | 2.332 | 2.205 | 2.416 |

As illustrated in Table 7, the mixing efficiency of compounding was improved when each of the invention polymeric alkoxide compounds were employed, as illustrated by the shorter mixing times of the invention compositions compared to both the tin-coupled polymer and the TEOS-terminated polymer. Moreover, the dispersion of the reinforcing filler in each of the invention compositions was equivalent to the comparative examples.

Example 4

This example illustrates the stability of the Mooney viscosity of the invention polymeric alkoxide compounds during storage in hot, humid environmental conditions, in comparison to the increase in Mooney viscosity exhibited by an equivalent siloxane (TEOS)-terminated polymer.

(a) Synthesis of Coupled TEOS Polymer

This polymer was prepared as a comparison TEOS-terminated polymer, with coupled polymer chains. This polymer is designated TEOS-2 in the following table.

To a one gallon reactor was charged 0.07 kg of hexane, 0.41 kg of 33.0 percent by weight styrene in hexane, and 1.74 kg 22.4 percent by weight butadiene in hexane. Then, 0.28 ml of 1.6 M 2-2'-di(tetrahydrofuryl) propane in hexane, 0.63 ml of 0.6 M potassium t-amylate in hexane, 1.42 ml of 3.54 M hexamethyleneimine and 3.93 ml of 1.6 M n-butyl lithium in hexane were charged into the reactor, and the jacket temperature was set at 122° F. After 97 minutes, 2.20 ml of 0.25 M tin tetrachloride in hexane was added to the reactor. Ten minutes later, 2.53 ml of 1.12 M tetraethoxyorthosilicate was added to the reactor. After 15 additional minutes, the cement was discharged from the reactor, coagulated with isopropanol, treated with DBPC, and drum dried. The properties of the polymer were: $ML_{1+4}$=52.4; percent chain coupling=74.5%; $M_n$=1.50×10$^5$.

(b) Storage of Polymers for Aging Studies

The polymers selected for aging studies were the coupled TEOS-terminated, coupled polymer synthesized in Example 4(a) above, and each of the invention polymers E-3, E-4 and E-5 synthesized in Example 3 above. After polymerization was completed, each polymer was milled into sheets and then cut into 1.5 in.×1.5 in. squares. These were stacked until a 20 to 25 gram sample was made of each polymer. These samples were then placed in a humidity chamber set to 55° C. and 85% humidity. Samples were removed from the humidity chamber after 1, 2, 5, 7 and 9 days of storage and the Mooney viscosity ($ML_{1+4}$) was measured.

Figure 1:
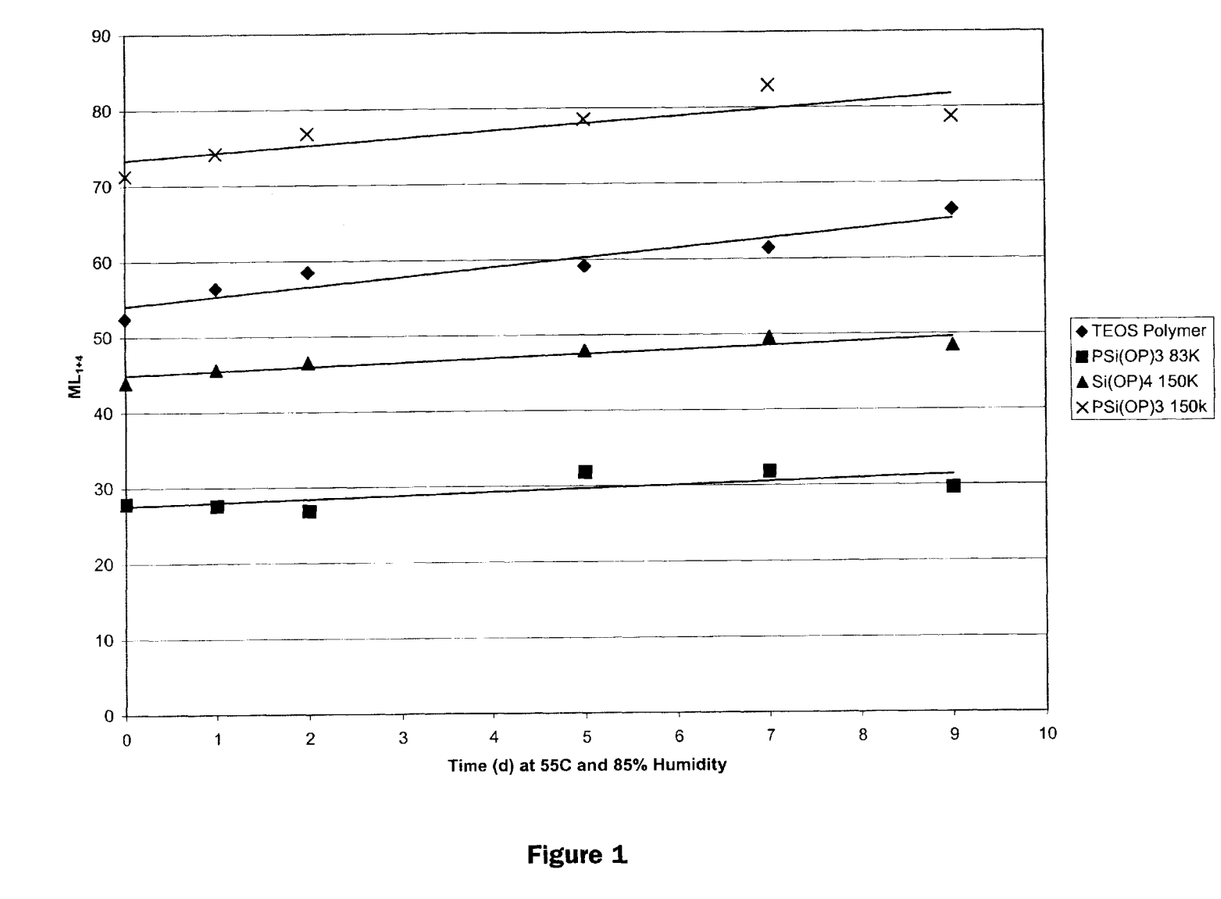
FIG. 1 is a graphical illustration of the stability of the Mooney viscosity over time in storage, at 55° C. and 85% humidity, of representative polymeric alkoxide compounds of the invention, compared with the increase in Mooney viscosity of an equivalent tetraethoxysilane (TEOS)-terminated polymer during the same time period under the same environmental conditions.

The results are illustrated in Table 8 and FIG. 1.

TABLE 8

Mooney Viscosities of Invention Polymeric Alkoxide Compounds and a Comparison Siloxane-Coupled Compound During Storage

| | Days in Storage ($ML_{1+4}$ Values) | | | | | | Delta $ML_{1+4}$ |
|---|---|---|---|---|---|---|---|
| Sample | 0 | 1 | 2 | 5 | 7 | 9 | |
| TEOS-2 | 52.4 | 56.4 | 58.5 | 59.1 | 61.4 | 66.4 | 14.0 |
| PSi(OP)$_3$ 83 k (E-3) | 27.9 | 27.6 | 26.9 | 31.8 | 31.8 | 29.6 | 1.7 |
| Si(OP)$_4$ 150 k (E-4) | 43.9 | 45.6 | 46.5 | 47.9 | 49.6 | 48.4 | 4.5 |
| PSi(OP)$_3$ 150 k (E-5) | 71.3 | 74.2 | 76.8 | 78.5 | 82.9 | 78.7 | 7.4 |

Example 5

This example illustrates a polymeric alkoxide compound of the invention produced by employing a bulky alkylene oxide compound, namely cyclohexene oxide, as the alkoxide precursor compound. Coupling of the bulky polymer-cyclohexene oxide-terminated chains with silicon tetrachloride, results in steric hindrance to the entry of water molecules and, therefore, inhibition of hydrolysis of the AO—Si bonds. The example illustrates that the addition of a hydrolysis catalyst, namely diphenylguanidine, in the master batch stage, results in a reduction in Mooney viscosity of the compound, compared to the addition of the catalyst in the final stage. The Mooney viscosity of the invention compound is compared with the Mooney viscosity of a compound employing an equivalent polymer having tin-coupled chains (without a hydrolyzable substituent) (TC-1, see Example 3).

(a) Synthesis of Cyclohexene Oxide Modified/SiCl$_4$ Coupled Polymer

To a 20 gallon reactor was added 13.82 kg of hexane, 19.72 kg of 25.3 percent by weight butadiene in hexane, and 6.18 kg of 33 percent by weight styrene in hexane. The jacket temperature was set to 120° F., and when the batch reached 95° F., 108 g of 3 percent by weight n-butyl lithium in hexane and 4.0 ml of hexamethyleneimine (neat) were added. Immediately after this, 1.0 ml of 2-2'-di (tetrahydrofuryl) propane and 1.8 ml of 15 percent by weight potassium t-amylate in hexane were added. After 44 minutes, 3.1 ml of cyclohexene oxide (neat) was added. After 5 minutes, 11 ml of 20 percent by weight silicon tetrachloride in hexane was added. After 35 minutes, 64 g of DBPC was added. The polymer was then steam desolventized. The properties of the polymer were: $ML_{1+4}$=51; $M_n$=1.49×10$^5$; and $T_g$=−49.1. This polymer is designated "E-6" in the tables below.

(b) Compounding of the Polymers to Form Invention and Comparison Vulcanizable Elastomeric Compounds The formulations for the compounding are presented in Table 9. Each rubber compound was prepared in four stages named master batch stage, first remill stage, second remill stage and final stage. The ingredients in the master batch stage were mixed in a 1.36 kg Banbury mixer operating at 77 RPM and 90° C. The ingredients were added and the mixing continued. After 75 seconds, the rotor speed was increased to 116 RPM. When a temperature of 165° C. was achieved, the batch was dropped. The time was then noted.

The ingredients in the first remill stage were the master batch mixture, silica and Si-69 (50% on carbon black) to the mixer operating at 90° C. and 77 RPM. After 75 seconds, the rotor speed was increased to 116 RPM. The remill material was removed from the mixer after a temperature of 150° C. was achieved.

The mixture obtained from the first remill stage was further mixed by adding the mixture resulting from the first remill stage to the mixer operating at 90° C. and 77 RPM. After 75 seconds the rotor speed was increased to 116 RPM. The resulting material from the second remill stage was removed from the mixer after a temperature of 150° C. was achieved.

The final stage ingredients, i.e., the material from the second remill stage and the curatives, were mixed in the mixer operating at 70° C. and 77 RPM. The final material was removed from the mixer after a temperature of 105° C. was achieved. The final products were then sheeted and cured at 165° C. for 20 minutes in standard molds placed in a hot press.

TABLE 9

Compounding Ingredients

| | phr |
|---|---|
| Master Batch Stage | |
| SBR Polymer | 50.0 |
| Natural Rubber | 20.0 |
| High cis polybutadiene | 10.0 |
| Solution SBR, 25% styrene, 27% oil | 27.5 |
| Antioxidant | 0.95 |
| Carbon Black | 30 |
| Silica | 17 |
| Oil + Wax | 17 |
| Diphenylguanidine | 0 or 0.5 |
| Total | 172.45 or 172.95 |
| First Remill Stage | |
| Master Batch Mixture | 172.45 or 182.95 |
| 50% Si-69 on Carbon Black N330 | 6.60 |
| Silica | 16.10 |
| Total | 195.15 or 195.65 |
| Second Remill Stage | |
| First Remill Mixture | 195.15 or 195.65 |
| Final Stage | |
| Second Remill Mixture | 195.15 or 195.65 |
| Zinc Oxide | 3.0 |

TABLE 9-continued

Compounding Ingredients

| | phr |
|---|---|
| Diphenylguanidine (DPG) | 0.5 or 0 |
| Accelerators | 1.5 |
| Fatty Acid | 1.5 |
| Sulfur | 1.9 |
| Total | 203.55 |

TABLE 10

Comparison of Invention and Comparative Polymers

| | 1 | 2 | 3 | 4 |
|---|---|---|---|---|
| TC-1 | 50 | 0 | 50 | 0 |
| P-Si(OR)$_3$ | 0 | 50 | 0 | 50 |
| DPG | Final | Final | Master | Master |
| Physical Test Results | | | | |
| MONSANTO CURE @ 165° C. | | | | |
| ML | 2.89 | 3.39 | 2.72 | 2.21 |
| MH | 16.811 | 16.92 | 16.28 | 13.61 |
| ts2 | 2.60 | 2.40 | 2.85 | 3.23 |
| tc90 | 10.16 | 7.12 | 7.23 | 6.49 |
| tan δ @ MH | 0.065 | 0.08 | 0.062 | 0.06 |
| Total Mixing Time (sec) | 417 | 386 | 386 | 340 |
| ML$_{1+4}$ (130° C.) | 67.0 | 81.2 | 71.6 | 60.5 |
| Scorch (T5 @ 130) | 15;42 | 14;52 | 16;20 | 19;48 |
| RING TENSILE @ 24° C. | | | | |
| 50% Modulus, psi | 204 | 204 | 205 | 155 |
| 100% Modulus, psi | 389 | 361 | 385 | 277 |
| 200% Modulus, psi | 892 | 835 | 890 | 617 |
| 300% Modulus, psi | 1572 | 1539 | 1605 | 1148 |
| Tensile strength, psi | 2398 | 2893 | 2581 | 2785 |
| % Elongation | 412 | 476 | 428 | 538 |
| RING TENSILE @ 100° C. | | | | |
| 50% Modulus, psi | 162 | 167 | 177 | 131 |
| 100% Modulus, psi | 315 | 309 | 340 | 246 |
| 200% Modulus, psi | 732 | 712 | 795 | 551 |
| Tensile str., psi | 1141 | 1453 | 1439 | 1148 |
| % Elongation | 279 | 337 | 311 | 337 |
| Lambourn @ 65%, g lost | 0.1065 | 0.0908 | 0.1044 | 0.0654 |
| Lambourn @ 65%, INDEX | 1.00 | 1.17 | 1.02 | 1.63 |
| Shore A, @ RT (peak) | 68.5 | 68 | 65.6 | 59.9 |
| Shore A, @ 100° C. (peak) | 63.4 | 62.3 | 61.6 | 57 |
| Pendulum Rebound 23° C. | 42.4 | 42.6 | 42.2 | 46.4 |
| Pendulum Rebound 50° C. | 46.8 | 47.4 | 48.6 | 52.2 |
| Tear Strength ppi @ 171° C. | 176 | 203 | 200 | 239 |
| Wet Stanley London | 58 | 57 | 54 | 53 |
| RHEOMETRICS @ 3.14 rad/sec | | | | |
| tan δ @ 7% E & 24° C. | 0.206 | 0.211 | 0.201 | 0.163 |
| G" (MPa) @ 7% E & 24° C. | 0.615 | 0.726 | 0.599 | 0.349 |
| ΔG' (MPa) @ 24° C. | 3.630 | 4.115 | 3.400 | 1.402 |
| G' (MPa) @ 14.5% E & 24° C. | 2.411 | 2.718 | 2.439 | 1.853 |
| tan δ @ 7% E & 65° C. | 0.143 | 0.156 | 0.143 | 0.123 |
| G" (MPa) @ 7% E & 65° C. | 0.345 | 0.393 | 0.335 | 0.210 |
| ΔG' (MPa) @ 65° C. | 2.053 | 2.319 | 1.975 | 0.873 |
| G' (MPa) @ 14.5% E & 65° C. | 2.093 | 2.160 | 2.002 | 1.540 |

As illustrated in Table 10, the Mooney viscosity ($ML_{1+4}$) of the compound comprising the invention polymer containing the bulky alkoxide groups is significantly reduced during mixing, when the DPG catalyst is added to the master batch (sample 4) compared with the addition of DPG in the final batch (sample 2). In contrast, there is no reduction in the Mooney viscosity of the compound comprising the tin-coupled polymer when DPG is added to the master batch (sample 3) compared with the addition in the final batch (sample 1).

The low $\Delta G'$ of the invention compound (sample 6) indicates that, as the invention polymer uncouples, it acts as a shielding agent for the silica. (The $\Delta G'$ indicates the degree of flocculation or agglomeration of the silica.) This shielding of the silica, in turn, results in a lower tan $\delta$, which is an indicator of reduced hysteresis. Thus, the use of a polymeric alkoxide compounds of the invention as the elastomeric component of the vulcanized elastomeric compounds show physical characteristics that result in better wear properties, rebound, and tear properties. All of these properties are achieved with a shorter compound mixing time.

While the invention has been described herein with reference to the preferred embodiments, it is to be understood that it is not intended to limit the invention to the specific forms disclosed. On the contrary, it is intended to cover all modifications and alternative forms falling within the spirit and scope of the invention.

We claim:

1. A polymeric alkylene oxide compound having the formula $$(PAO)_n M^{+z} P'_{z-n}$$

where P is a polymer chain containing units formed from conjugated diene monomers; a P' or is another polymer chain P or is an R group selected from the group consisting of alkyl groups having one to about 30 carbon atoms, aromatic groups having 6 to about 20 carbon atoms, and cycloalkyl groups having about 5 to about 20 carbon atoms; A is an alkylene group connecting the polymer chain P to an oxygen atom O through one or 2 carbon atoms, wherein each carbon atom has at least one attached R' group, said R' groups being the same or different from each other and independently selected from the group consisting of hydrogen, alkyl groups having one to about 30 carbon atoms, aromatic groups having 6 to about 20 atoms, and cycloalkyl groups having about 5 to about 20 carbon atoms; M is a metal atom or a nonmetal atom, having an oxidation state "z" of greater than one, wherein the nonmetal atom is selected from the group consisting of atoms of phosphorus, boron, nitrogen, silicon, arsenic and sulfur; and n is an integer having a value of from 1 to z.

2. The compound of claim 1, wherein the metal atom is selected from the group consisting of atoms of tin, titanium, aluminum, copper, calcium and zinc.

3. The compound of claim 1, wherein the polymeric alkylene oxide compound is produced by the process of reacting the living end of a polymer chain prepared by anionic polymerization with a monoalkyl metal initiator, after solution polymerization but while still in the presence of an inert solvent, with less than or equal to one equivalent of an alkylene oxide precursor compound per polymer chain, wherein the precursor compound is selected from the group consisting of epoxides and carbonyl compounds, and, subsequently, reacting the polymer chain with one equivalent per polymer chain of $M^{+z}$—X bonds contained in a coupling agent having the formula $$M^{+z} X_{z-m} R_m$$

where $M^{+z}$ and R are the same as in claim 1, X is a halide, (z–m) represents an integer having a value of at least 2, and m is an integer having a value of zero to (z–2).

4. The compound of claim 3, wherein the epoxide has the formula where $R_1$, $R_2$, $R_3$ and $R_4$ are the same or different from each other, and are independently selected from the group consisting of hydrogen atoms, alkyls having one to about 30 carbon atoms, aromatics having 6 to about 20 carbon atoms, and cycloalkyls having about 5 to about 20 carbon atoms.

5. The compound of claim 4, wherein the epoxide is selected from the group consisting of ethylene oxide, propylene oxide, cyclohexene oxide, cyclopentene oxide and styrene oxide.

6. The compound of claim 3, wherein the carbonyl compound has the formula where D and E are the same or different from each other, and wherein D and E may be bonded to each other to form a cyclic compound, and wherein D and E are independently selected from the group consisting of alkyls having one to about 30 carbon atoms, aromatics having 6 to about 20 carbon atoms, dialkyl amino-substituted aromatics wherein each alkyl group has one to about 30 carbon atoms, cycloalkyls having about 5 to about 20 carbon atoms, and dialkyl amino compounds wherein each alkyl group has one to about 30 carbon atoms.

7. The compound of claim 6, wherein the carbonyl compound is selected from the group consisting of tetramethyldiamino-benzophenone, 1,3-dimethyl-2-imidazolidinone, 1-alkyl substituted pyrrolidinones, 1-aryl substituted pyrrolidinones, and mixtures thereof.

8. The compound of claim 3, wherein the coupling agent is selected from the group consisting of silicon tetrachloride, alkyltrichlorosilane, dialkyldichlorosilane, silicon tetrabromide, alkyltribromosilane, dialkyldibromosilane, tin tetrachloride, alkyl tin trichloride, dialkyl tin dichloride, tin tetrabromide, alkyl tin tribromide, dialkyl tin dibromide, titanium tetrachloride, alkyl titanium trichloride, dialkyl titanium dichloride, titanium tetrabromide, alkyl titanium tribromide, dialkyl titanium dibromide, aluminum trichloride, alkyl aluminum dichloride, aluminum tribromide, alkyl aluminum dibromide, arsenic trichloride, alkyl arsenic dichloride, arsenic tribromide, alkyl arsenic dibromide, boron trichloride, alkyl boron dichloride, boron tribromide, alkyl boron dibromide, nitrogen trichloride, alkyl nitrogen dichloride, nitrogen tribromide, alkyl nitrogen dibromide, phosphorus trichloride, alkyl phosphorus dichloride, phosphorus tribromide, alkyl phosphorus dibromide, copper dichloride, copper dibromide, calcium dichloride, calcium dibromide, zinc dichloride, zinc dibromide, sulfur dichloride, and mixtures thereof.

9. The compound of claim 1, wherein the polymer chain P is selected from the group consisting of homopolymers of conjugated diene monomers, and copolymers and terpolymers of the conjugated diene monomers with monovinyl aromatic monomers and trienes.

10. The compound of claim 9, wherein the polymer chain is selected from the group consisting of polyisoprene, polystyrene, polybutadiene, butadiene-isoprene copolymer, butadiene-isoprene-styrene terpolymer, isoprene-styrene copolymer, and styrene-butadiene copolymer.

11. The compound of claim 1, wherein the compound has an initial viscosity, and the viscosity of the compound does not increase above the initial viscosity by more than about 50% over a time period of up to about two years in ambient conditions.

12. The compound of claim 11, wherein the viscosity does not increase by more than about 25%.

13. The compound of claim 12, wherein the viscosity does not increase by more than about 10%.

14. A method of making a polymeric alkylene oxide compound having the formula $$(PAO)_n M^{+z} P'_{z-n}$$

where P is a polymer chain containing units formed from conjugated diene monomers; P' is another polymer chain P or is an R group selected from the group consisting of alkyl groups having one to about 30 carbon atoms, aromatic groups having 6 to about 20 carbon atoms, and cycloalkyl groups having about 5 to about 20 carbon atoms; A is an alkylene group connecting the polymer chain P to an oxygen atom O through one or 2 carbon atoms, wherein each carbon atom has at least one attached R' group, said R' groups being the same or different from each other and independently selected from the group consisting of hydrogen, alkyl groups having one to about 30 carbon atoms, aromatic groups having 6 to about 20 atoms, and cycloalkyl groups having about 5 to about 20 carbon atoms; M is a metal atom or a nonmetal atom, having an oxidation state "z" of greater than one, wherein the nonmetal atom is selected from the group consisting of atoms of phosphorus, boron, nitrogen, silicon, arsenic and sulfur; and n is an integer having a value of from 1 to z, comprising the steps of:
providing a polymer chain prepared by anionic solution polymerization with a monoalkyl metal initiator and comprising a living end,
reacting the living end of the polymer chain, after polymerization but while still in the presence of an inert solvent, with less than or equal to one equivalent of an alkylene oxide precursor compound per polymer chain, wherein the precursor compound is selected from the group consisting of epoxides and carbonyl compounds; and
subsequently reacting the resulting polymer chain with one equivalent per polymer chain of $M^{+z}$—X bonds contained in a coupling agent having the formula

$$M^{+z} X_{z-m} R_m$$

where $M^{+z}$ and R are the same as above, X is a halide; (z−m) represents an integer having a value of at least 2, and m is an integer having a value of zero to (z−2).

15. The method of claim 14, wherein the metal atom is selected from the group consisting of atoms of tin, titanium, aluminum, copper, calcium and zinc.

16. The method of claim 14, wherein the coupling agent is selected from the group consisting of silicon tetrachloride, alkyltrichlorosilane, dialkyldichlorosilane, silicon tetrabromide, alkyltribromosilane, dialkyldibromosilane, tin tetrachloride, alkyl tin trichloride, dialkyl tin dichloride, tin tetrabromide, alkyl tin tribromide, dialkyl tin dibromide, titanium tetrachloride, alkyl titanium trichloride, dialkyl titanium dichloride, titanium tetrabromide, alkyl titanium tribromide, dialkyl titanium dibromide, aluminum trichloride, alkyl aluminum dichloride, aluminum tribromide, alkyl aluminum dibromide, arsenic trichloride, alkyl arsenic dichloride, arsenic tribromide, alkyl arsenic dibromide, boron trichloride, alkyl boron dichloride, boron tribromide, alkyl boron dibromide, nitrogen trichloride, alkyl nitrogen dichloride, nitrogen tribromide, alkyl nitrogen dibromide, phosphorus trichloride, alkyl phosphorus dichloride, phosphorus tribromide, alkyl phosphorus dibromide, copper dichloride, copper dibromide, calcium dichloride, calcium dibromide, zinc dichloride, zinc dibromide, sulfur dichloride, and mixtures thereof.

17. The method of claim 14, wherein the epoxide has the formula where $R_1$, $R_2$, $R_3$ and $R_4$ are the same or different from each other, and are independently selected from the group consisting of hydrogen atoms, alkyls having one to about 30 carbon atoms, aromatics having 6 to about 20 carbon atoms, and cycloalkyls having about 5 to about 20 carbon atoms.

18. The method of claim 17, wherein the epoxide is selected from the group consisting of ethylene oxide, propylene oxide, cyclohexene oxide, cyclopentene oxide and styrene oxide.

19. The method of claim 14, wherein the carbonyl compound has the formula where D and E are the same or different from each other, and wherein D and E may be bonded to each other to form a cyclic compound, and wherein D and E are independently selected from the group consisting of alkyls having one to about 30 carbon atoms, aromatics having 6 to about 20 carbon atoms, dialkyl amino-substituted aromatics wherein each alkyl group has one to about 30 carbon atoms, cycloalkyls having about 5 to about 20 carbon atoms, and dialkyl amino compounds wherein each alkyl group has one to about 30 carbon atoms.

20. The method of claim 19, wherein the carbonyl compound is selected from the group consisting of tetramethyldiamino-benzophenone, 1,3-dimethyl-2-imidazolidinone, 1-alkyl substituted pyrrolidinones, 1-aryl substituted pyrrolidinones, and mixtures thereof.

21. The method of claim 14, wherein the polymer chain having the living end is selected from the group consisting of homopolymers of conjugated diene monomers, and copolymers and terpolymers of the conjugated diene monomers with monovinyl aromatic monomers and trienes.

22. The method of claim 21, wherein the polymer chain is selected from the group consisting of polyisoprene, polystyrene, polybutadiene, butadiene-isoprene copolymer, butadiene-isoprene-styrene terpolymer, isoprene-styrene copolymer, and styrene-butadiene copolymer.

* * * * *